(12) United States Patent
Yonehana et al.

(10) Patent No.: US 7,491,154 B2
(45) Date of Patent: Feb. 17, 2009

(54) BICYCLE SIMULATION SYSTEM

(75) Inventors: Atsushi Yonehana, Saitama (JP);
Ryukou Hanaya, Saitama (JP);
Sadanao Ichimi, Saitama (JP); Yukio Miyamaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 11/441,162

(22) Filed: May 26, 2006

(65) Prior Publication Data

US 2006/0270522 A1  Nov. 30, 2006

(30) Foreign Application Priority Data

May 30, 2005  (JP)  ............... 2005-157563
Jun. 28, 2005  (JP)  ............... 2005-187940

(51) Int. Cl.
*A63B 22/06* (2006.01)
*A63B 71/00* (2006.01)

(52) U.S. Cl. ............... 482/57; 482/1; 482/8; 434/61

(58) Field of Classification Search ............... 482/63, 482/1, 900, 902, 903, 909, 8, 57–65; 463/36; 434/61; 280/233
See application file for complete search history.

(56) References Cited

U.S. PATENT DOCUMENTS

| | | | | |
|---|---|---|---|---|
| 4,512,567 A | * | 4/1985 | Phillips | ............... 463/37 |
| 4,542,897 A | * | 9/1985 | Melton et al. | ............... 463/7 |
| 4,637,605 A | * | 1/1987 | Ritchie | ............... 463/37 |
| 4,709,917 A | * | 12/1987 | Yang | ............... 482/63 |
| 4,720,789 A | * | 1/1988 | Hector et al. | ............... 463/33 |
| 4,875,885 A | * | 10/1989 | Johnson | ............... 446/189 |
| 5,076,584 A | * | 12/1991 | Openiano | ............... 463/36 |
| 5,180,347 A | * | 1/1993 | Chen | ............... 482/5 |
| 5,240,417 A | * | 8/1993 | Smithson et al. | ............... 434/61 |
| 5,462,503 A | * | 10/1995 | Benjamin et al. | ............... 482/4 |
| 5,961,424 A | * | 10/1999 | Warner et al. | ............... 482/63 |
| 6,152,856 A | * | 11/2000 | Studor et al. | ............... 482/8 |
| 6,336,891 B1 | * | 1/2002 | Fedrigon et al. | ............... 482/8 |
| 6,712,737 B1 | * | 3/2004 | Nusbaum | ............... 482/8 |
| 2003/0171190 A1 | * | 9/2003 | Rice | ............... 482/57 |
| 2005/0233866 A1 | * | 10/2005 | Miyamaru et al. | ............... 482/57 |
| 2006/0074645 A1 | * | 4/2006 | Tischer | ............... 704/226 |

FOREIGN PATENT DOCUMENTS

| | | |
|---|---|---|
| JP | 10-277263 A | 10/1998 |
| JP | 2001-87417 A | 4/2001 |
| JP | 2004246131 A * | 9/2004 |

* cited by examiner

*Primary Examiner*—Fenn C Mathew
*Assistant Examiner*—Andrew M Tecco
(74) *Attorney, Agent, or Firm*—Birch, Stewart, Kolasch & Birch, LLP

(57) ABSTRACT

To realize a light steering handle operation similar to that of a real bicycle, and to obtain an appearance similar to that of a real bicycle. A bicycle simulation system has a turnable steering handle, a left-right pair of pedals, a frame for turnably supporting the steering handle and the pedals, a monitor for displaying a scenery according to the simulated running velocity required by a first speed pickup, a controller supplying sensor signals to a main control unit which controls the monitor. The controller is provided on front forks that function as a front stand.

21 Claims, 14 Drawing Sheets

BICYCLE SIMULATION SYSTEM

CROSS-REFERENCE TO RELATED APPLICATIONS

This nonprovisional application claims priority under 35 U.S.C. § 119(a) on Patent Application Nos. 2005-157563 and 2005-187940, filed in Japan on May 30, 2005 and Jun. 28, 2005, respectively. The entirety of each of the above application is incorporated herein by reference.

BACKGROUND OF THE INVENTION

1. Field of the Invention:

The present invention relates to a bicycle simulation system used for traffic safety education and training, games, physical training, or the like.

2. Description of Background Art:

Simulation systems corresponding to respective vehicles have been proposed for simulated experience of operations of an airplane, an automobile, a motorcycle, a bicycle and the like. Some of the simulation systems have been put to practical use. In a bicycle simulation system, a rider seated astride a saddle of a dummy bicycle works the pedals to thereby perform a simulated cycling. The rotation of the pedals is detected by a speed sensor to determine the simulated velocity or the like, whereby a simulation process is executed. In a vehicle simulation system, it is preferable, for enhancing realism, to display on a monitor screen a scene varied according to the simulated running velocity and to generate a mimic sound.

In the bicycle simulation system, when scenery varied according to the simulated running velocity is displayed on a monitor, the realism is improved. A picture processing computer for displaying the scenery on the monitor is comparatively large because it includes a recording medium for storing a large amount of data, a picture processing arithmetic board and the like. Therefore, the picture processing computer is installed as a body separate from the dummy bicycle.

On the other hand, the dummy bicycle is provided with electric apparatuses such as a speed sensor. Therefore, a controller is provided for carrying out control processes for the electric apparatuses. The controller is connected to the picture processing computer. In a bicycle simulator for training, such a controller is provided at a fixed type steering handle portion (see, for example, Japanese Patent Laid-open No. 2001-87417).

A bicycle is capable of calm operation, since it does not have any drive source such as an engine, a motor, etc. On the other hand, a one-way clutch provided at a rotary shaft of the rear wheel generates an intermittent ratchet mechanism notch sound "click-clack" according to the difference between the rotation speed of a drive sprocket and the rotation speed of the rear wheel. This sound is a characteristic sound at the time of riding a bicycle. When such a notch sound is generated in a bicycle simulation system, the realism is favorably enhanced.

A dummy bicycle used in a bicycle simulation system may be provided with a flywheel operated in conjunction with the pedals so as to exert an appropriate load on the pedals. Therefore, a real notch sound can be generated by providing the flywheel with a one-way clutch. However, depending on the design conditions of the flywheel and the gear ratio, the rotation speed of the flywheel at the time of a predetermined simulated running velocity is not necessarily equal to the rotation speed of the rear wheel of a real bicycle at the same running velocity. In addition, the rotation speed of the flywheel may be different from the rotation speed of the rear wheel in a situation (for example, a descending slope) assumed in the simulated cycling. The notch sound generated from the one-way clutch at the flywheel may give the rider a sense of incompatibility.

For generating a mimic sound of a vehicle, there has been proposed a system for generating a sound similar to an actual engine sound by detecting an accelerator operation amount and using a fluctuation processing, a sound transmission path simulating process, a sound synthesizing process for synthesizing a plurality of engine sounds, and the like (see Japanese Patent Laid-open No. Hei 10-277263).

SUMMARY OF THE INVENTION

The present invention has been made in consideration of the above problems. Accordingly, it is an object of the present invention to provide a bicycle simulation system capable of generating an appropriate mimic sound according to a real bicycle and the situation assumed in a simulated cycling.

In the bicycle simulation system, when the steering handle is so configured as to be capable of turning operations and the turning operations are reflected on the scenery displayed on the monitor, the realism is favorably enhanced. In this case, a signal from a steering angle sensor for detecting the turning operations is processed by the controller, in the same manner as the signal from the speed sensor for detecting the simulated velocity, and then supplied to the picture processing computer.

The controller in the bicycle simulation system is connected with various electric apparatuses such as a crank angle rotation sensor in addition to the speed sensor and the steering angle sensor. Therefore, the shape of the controller is increased in size according to the amount of signals to be processed.

When such a comparatively large controller is provided at the steering handle portion, it becomes difficult to operate the steering handle due to the weight. In addition, the controller may appear in the visual field of the rider, and may unfavorably affect the appearance of the bicycle simulation system.

The present invention has been made in consideration of the above-mentioned problems. Accordingly, it is an object of the present invention to provide a bicycle simulation system that has a light steering handle operation similar to that on a real bicycle. In addition, an appearance that is similar to that of a real bicycle can be obtained.

According to an embodiment of the present invention, a bicycle simulation system includes a dummy bicycle and a display unit. The dummy bicycle includes a steering handle operated by a rider, a left-right pair of pedals worked by the rider, a frame for turnably supporting the steering handle and the pedals, and a controller for relaying a signal from a predetermined electric apparatus so as to supply the signal to the display unit; and the controller is provided on the frame. The relaying of the signal by the controller includes the case of supplying the signal through a predetermined signal processing.

Such a configuration in which the controller is provided on the frame, not on a turnable portion such as the steering handle, ensures that the feeling during the riding is similar to that in riding a real bicycle. Particularly, the steering handle provides the same light operation feeling and appearance as steering handle of a real bicycle. A steering handle is one of the main characteristic portions in the appearance of a bicycle, not only as viewed from the rider seated astride the saddle but also as viewed from a distance. Therefore, the configuration in which the same appearance as that of a steering handle of a real bicycle can be obtained promises an enhanced realism.

In this case, preferably, the frame includes a stand as a support member provided at a lower portion of the steering handle. The controller is provided at the stand. The vicinity of the stand would not easily appear in the visual field of the rider, so that the controller does not spoil the appearance. In addition, since a display unit is disposed on the front side of the rider, the arrangement of the controller at the stand ensures that a signal cable for connecting the controller to the display unit is set short. Therefore, the stability of signals being transmitted is enhanced, and it is easy to lay the signal cable around. Furthermore, the vicinity of the stand is a dead space where no other special component part is present. Therefore, even a comparatively large controller can be arranged without influencing the layout of other component parts.

Furthermore, preferably, a mat switch is provided for detecting the treading on a floor by the foot or feet of the rider. The mat switch is connected to the controller. Since the mat switch is disposed on the floor, the mat switch is close to the controller. Therefore, a signal cable for connecting the mat switch to the controller can be set short.

A bicycle simulation system according to another embodiment of the present invention includes: a left-right pair of pedals connected to a crankshaft and worked by a rider; a rotary body rotated in conjunction with the working of the pedals; a first speed sensor for detecting the rotation speed of the rotary body; a second speed sensor for detecting the rotation speed of the crankshaft; a simulated velocity setting unit for determining a simulated running velocity based on the rotation speed of the rotary body detected by the first speed sensor; a display unit for displaying a scene based on the simulated running velocity; a frequency setting unit for determining a frequency by multiplying by a coefficient the difference between a sprocket rotation speed, which is obtained by multiplying the rotation speed of the crankshaft detected by the second speed sensor by a predetermined gear ratio, and a virtual rear wheel rotation speed obtained from the simulated running velocity; and a mimic sound generation unit for generating a mimic sound based on the frequency.

The rotation speed of the rotary body and the rotation speed of the crankshaft are detected. The difference between the two rotation speeds is determined in consideration of the rotational ratio. Therefore, it is possible to generate an appropriate mimic sound according to a real bicycle and the situation assumed in the simulated cycling, based on the difference. In this case, when a sound obtained by recording the notch sound generated by a one-way clutch is used as the mimic sound, it is possible to generate a sound with higher realism.

The mimic sound generation unit may stop generating the mimic sound when the sprocket rotation speed is not less than the virtual rear wheel rotation speed, whereby the generation of the mimic sound is stopped at a natural timing that is the same as the timing when the notch sound in a real bicycle is stopped.

Preferably, when the situation of the simulated cycling assumed is a slope, the simulated velocity setting unit varies the simulated running velocity according to the slope inclination degree. As a result, a high-frequency mimic sound can be generated for a descending slope in the simulated cycling. A low-frequency mimic sound can be generated for an ascending slope in the simulated cycling. Therefore, the mimic sound becomes similar to the real sound of cycling.

Another bicycle simulation system according to an embodiment of the present invention includes: a left-right pair of pedals connected to a crankshaft and worked by a rider; a speed sensor for detecting the rotation speed of the crankshaft; a simulated velocity setting unit for setting a simulated running velocity; a display unit for displaying a scene varied in correspondence with the simulated running velocity; a frequency setting unit which, when a value obtained by subtracting the rotation speed of the crankshaft multiplied by a coefficient from the simulated running velocity is a positive value, determines a frequency proportional to the positive value; and a mimic sound generation unit for generating a mimic sound based on the frequency.

The mimic sound is generated at the frequency obtained based on the difference between the rotation speed of the crankshaft multiplied by a coefficient and the simulated running velocity. Therefore, it is possible to generate an appropriate mimic sound according to a real bicycle and the situation assumed in the simulated cycling.

According to the bicycle simulation system of the present invention, the rotation speed of the rotary body and the rotation speed of the crankshaft are detected, and the difference between the two rotation speeds is obtained in consideration of the rotational ratio, whereby it is possible to generate an appropriate mimic sound according to a real bicycle and the situation assumed in the simulated cycling, based on the difference.

The simulated running velocity is not limited to a simulated running velocity set by the rotation speed of the rotary body but may be a simulated running velocity corresponding to the variation speed of the scene in the display unit. In this case, the mimic sound may be generated at a frequency obtained based on the difference between the rotation speed of the crankshaft multiplied by a constant and the simulated running velocity. Therefore, a natural simulated cycling is realized in which the running feeling obtained from the visual sense and the running feeling obtained from the auditory sense accord to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
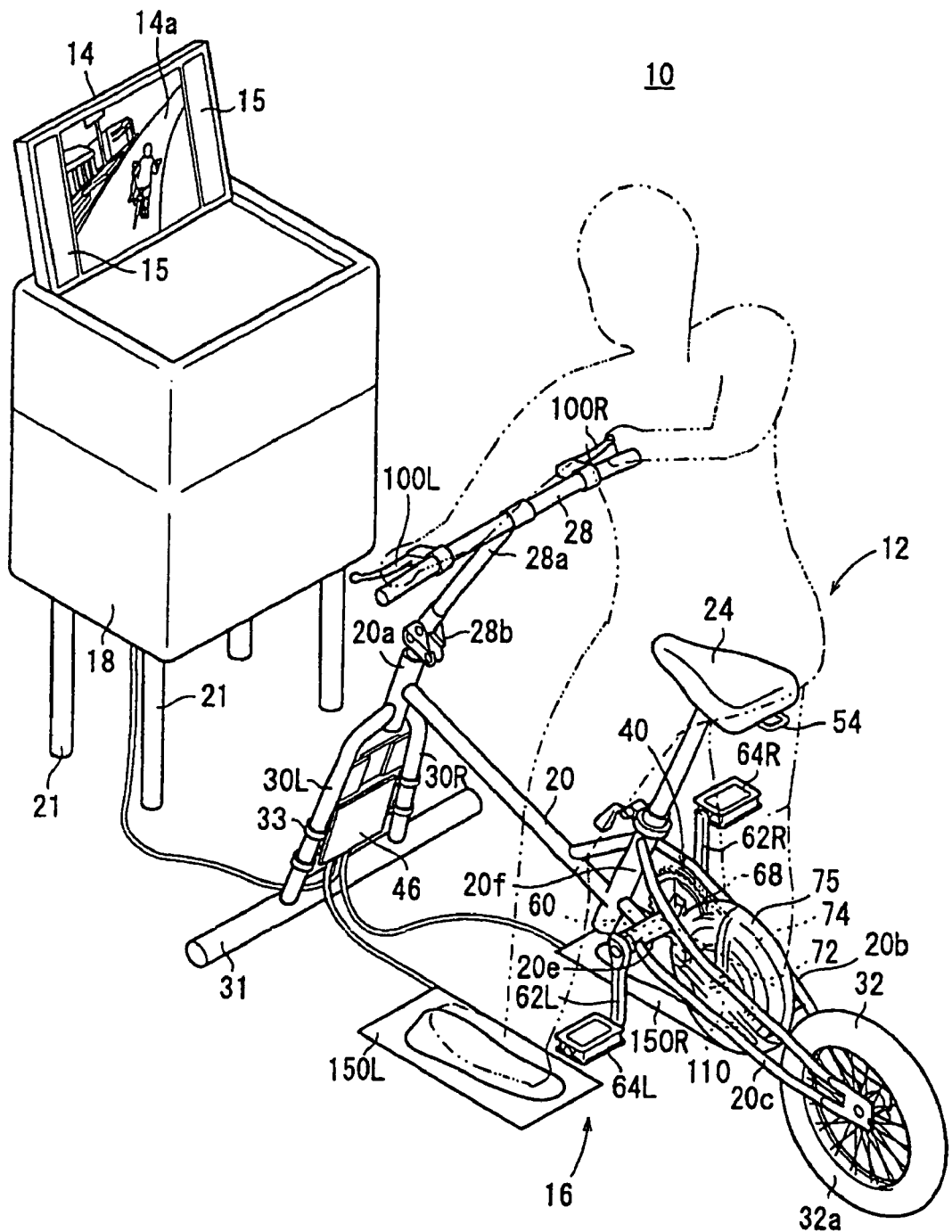
FIG. 1 is a perspective view of a bicycle simulation system according to the present embodiment.

The bicycle simulation system according to the present invention will now be described in detail with reference to the accompanying drawings. It should be noted that the same reference numerals have been used to identify the same or similar elements throughout the several views.

As shown in FIG. 1, the bicycle simulation system 10 according to this embodiment has a dummy bicycle 12, a monitor 14 for displaying scenery according to the operation of the dummy bicycle 12 on a screen 14$a$, a loudspeaker 15 for providing simulated sounds and vocal instructions to the rider, a mat switch 16 provided at a position where the rider rides on and gest off the dummy bicycle 12, and a main control unit 18 for performing total control of the bicycle simulation system 10. The main control unit 18 is disposed on the front side of the dummy bicycle 12. The monitor 14 and the loudspeaker 15 are disposed at an upper portion of the main control unit 18 and at positions permitting easy visual checking by the rider of the dummy bicycle 12. The main control unit 18, the monitor 14 and the loudspeaker 15 are supported by four struts 21 so that their height can be adjusted to the physical form of the rider. In addition, the main control unit 18 has the function of displaying on the screen 14$a$ a picture corresponding to the simulation, and also has a function as a picture processing computer.

The dummy bicycle 12 will now be described. In the following description, as to a left-right pair of mechanisms in the dummy bicycle 12, "L" will be attached to the reference numeral for the left one, and "R" will be attached to the reference numeral for the right one.

The dummy bicycle 12 has a frame 20, a saddle 24 connected to the frame 20 through a seat pillar, a steering handle 28 that is turnable about a head tube 20$a$ of the frame 20, two front forks 30R and 30L as a stand for fixingly supporting the head tube 20$a$, and a rear wheel 32 rotatably supported by a seat stay 20$b$ and a chain stay 20$c$ of the frame 20. A pipe 31 extending in a horizontal direction is provided at the tip ends of the front forks 30R and 30L. The pipe 31 is grounded on a floor. A stem 28$a$ of the steering handle 28 has a folding mechanism 28$b$ in the vicinity of the head tube 20$a$, and can be folded or disassembled.

Although the front forks 30R, 30L are similar in shape to a front fork of a bicycle (or motorcycle) from the outside, they differ from a real front fork in that they are not turned in conjunction with the steering handle 28 and they are not provided with a front wheel. The rear wheel 32 is provided with a tire 32$a$ having a somewhat small diameter. The tire 32$a$ is grounded on the floor so that the rear wheel 32 functions also as a rear stand. Thus, the dummy bicycle 12 is erected by being supported by the front forks 30R, 30L and the rear wheel 32. A controller 46 is fixed between the front forks 30R and 30L and the pipe 31, through a bracket 33. The position where the controller 46 is laid out is not limited to a position between the front forks 30R and 30L and the pipe 31. The controller 46 may be fixed at any other position of the frame 20.

In addition, the dummy bicycle 12 has a rotation drive mechanism unit 40, a speed detection mechanism unit 42 (see FIG. 3), a brake mechanism unit 44 (see FIG. 4) and the controller 46. A steering angle sensor 50 (see FIG. 4) is provided for detecting the steering angle of the steering handle 28. A microphone 52 (see FIG. 4) is provided for inputting the voice of the rider. A recession switch 54 is provided at a rear portion of the saddle 24. The recession switch 54 is a switch to be operated when the rider gets off the dummy bicycle 12 and performs a predetermined simulated receding motion.

The rotation drive mechanism unit 40 has a pair of cranks 62L and 62R connected to left and right portions of a crankshaft 60 provided inside a crank tube 20$e$. Pedals 64L and 64R are provided at the tip ends of the cranks 62L and 62R. A front sprocket 66 is provided on the crank 62R. A rear sprocket 70 (see FIG. 2) is rotationally driven by the front sprocket 66 through a chain 68. An iron flywheel (rotary body) 74 is rotationally driven by the rear sprocket 70 through a one-way clutch (also called free hub) 72. The flywheel 74 is provided between a seat tube 20$f$ and the rear wheel 32, and is rotatably supported by the one-way clutch 72. The number of teeth z1 of the front sprocket 66 is greater than the number of teeth z2 of the rear sprocket; for example, z1=52, z2=24. The gear ratio (rotational ratio) R is R=52/24.

The one-way clutch 72 and the flywheel 74 are covered with a transparent cover 75. A notch sound generated by the one-way clutch 72 is substantially shielded by the cover 75. A silent type one-way clutch may be used so as to restrain the generation of the real notch sound.

The one-way clutch 72 transmits only a rotational drive force in the forward direction of the rear sprocket 70 to the flywheel 74 by a ratchet mechanism therein. Therefore, when the crankshaft 60 is rotated in the reverse direction or when the rotation of the crankshaft 60 is stopped during the forward rotation of the flywheel 74, the rotating condition (forward rotation or stoppage) of the flywheel 74 at that time is maintained, irrespectively of the crankshaft 60.

Figure 2:
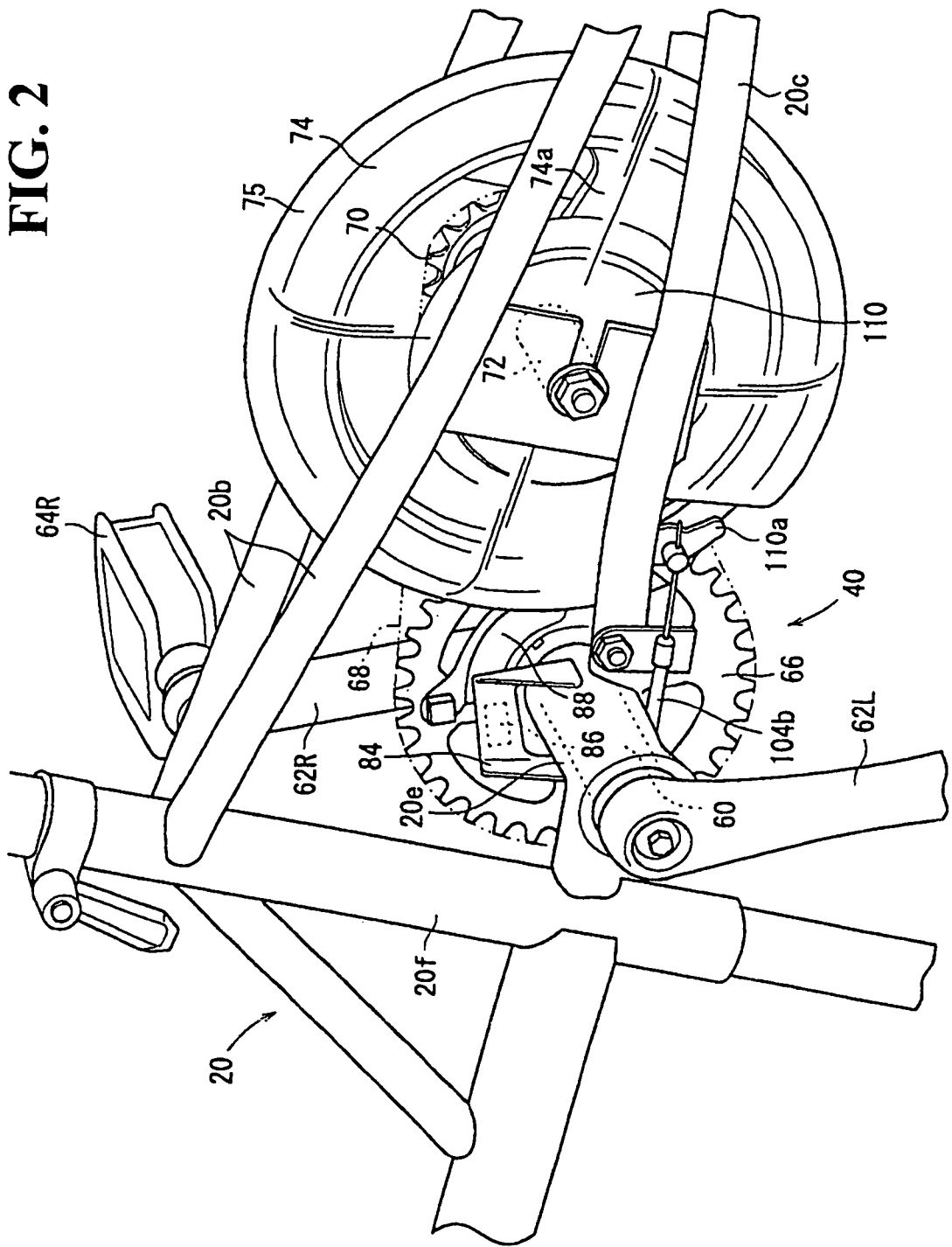
FIG. 2 is a perspective view of a rotation drive mechanism unit and the vicinity thereof in a dummy bicycle.
Figure 3:
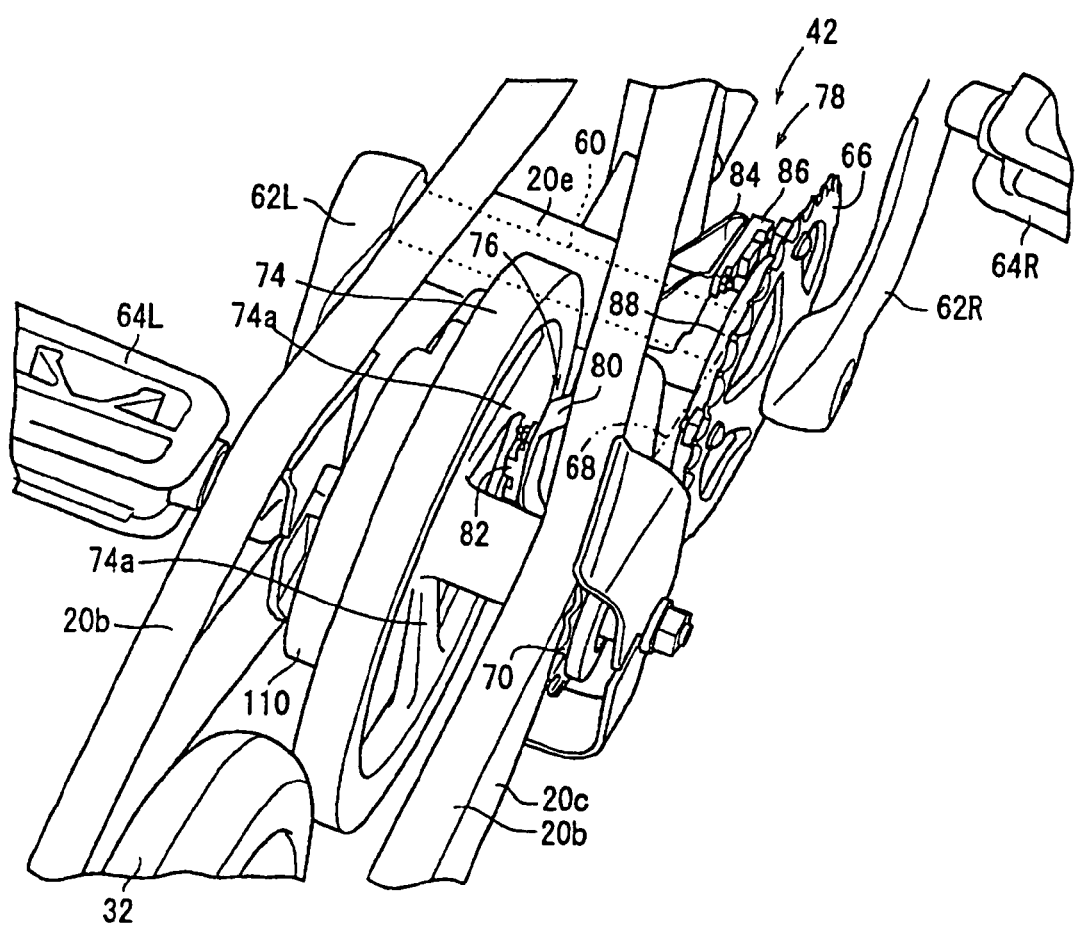
FIG. 3 is a perspective view of a flywheel and the vicinity thereof in the dummy bicycle.

As shown in FIGS. 2 and 3, the speed detection mechanism unit 42 has a wheel rotation detecting portion 76 and a crank rotation detecting portion 78. The wheel rotation detecting portion 76 has a mount bracket 80 provided over the range from the seat stay 20$b$ on the right side to a chain stay 20$c$. A first speed pickup 82 is provided on the mount bracket 80. The first speed pickup 82 is disposed at a position closely opposed to three spokes 74$a$ of the flywheel 74. When the flywheel 74 is rotated, the first speed pickup 82 supplies the controller 46 with a signal indicating the presence or absence of the spoke 74$a$. For permitting the inside mechanism to be seen, the cover 75 is omitted in FIG. 3.

The crank rotation detecting portion 78 has a mount bracket 84 fixed to the crank tube 20$e$. A second speed pickup 86 is provided on the mount bracket 84. A detected rotor 88 is fixed to the inside of the front sprocket 66. The detected rotor 88 is an about 90° circular arc-shaped plate, and is disposed closely opposed to the second speed pickup 86. When the pedals 64L and 64R are worked and the crankshaft 60 and the front sprocket 66 are thereby rotated, the second speed pickup 86 supplies the controller 46 with a signal indicating the presence or absence of the detected rotor 88. The second speed pickup 86 and the first speed pickup 82 are interchangeable.

Figure 4:
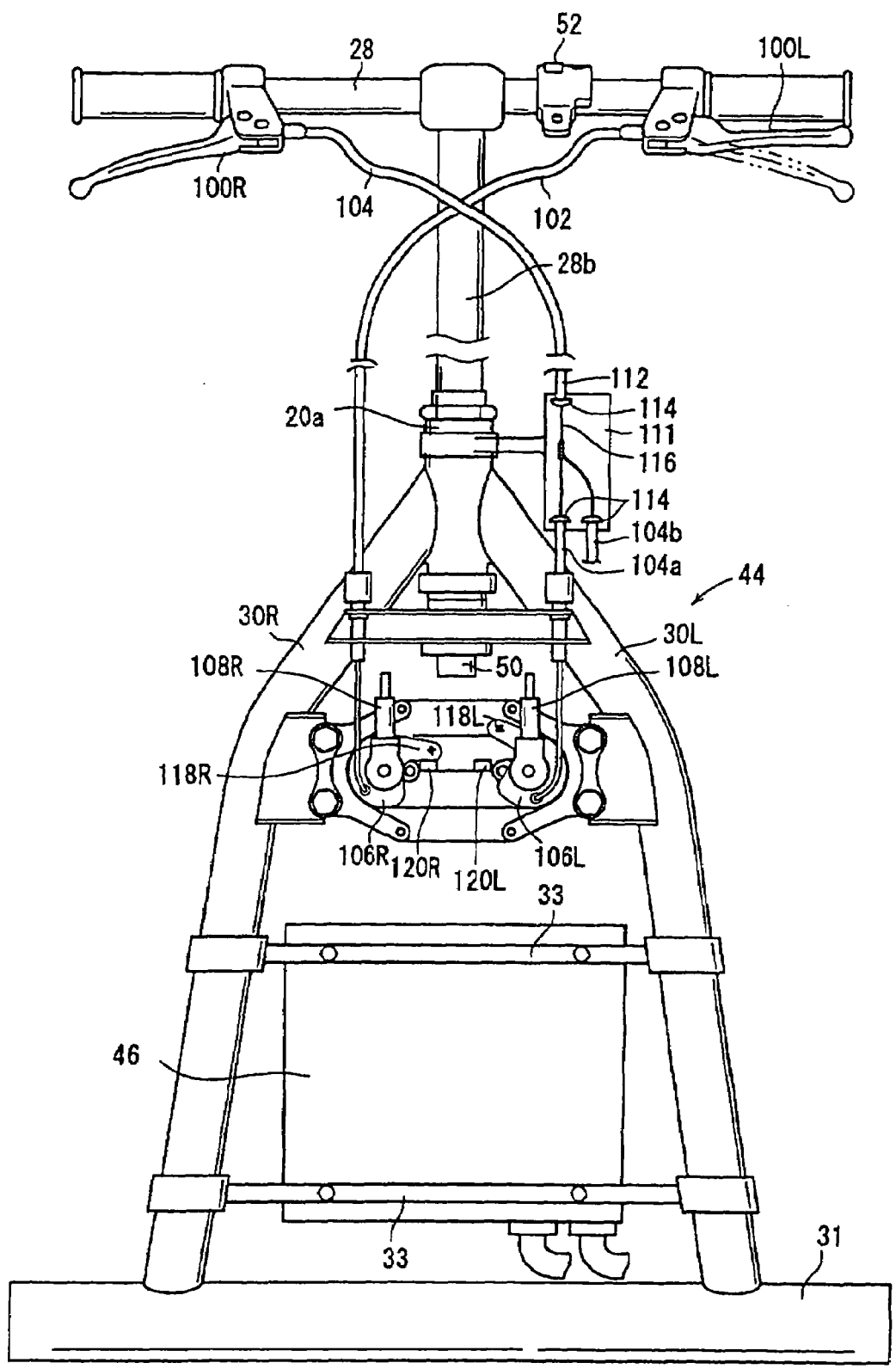
FIG. 4 is a front view of the dummy bicycle.

As shown in FIG. 4, the brake mechanism unit 44 has two brake levers 100L and 100R provided on the steering handle 28. Brake wires 102 and 104 are connected respectively to the brake levers 100L and 100R. The brake mechanism unit 44 also has elastically rotatable pulleys 106L and 106R, rotation sensors 108L and 108R, and a drum brake 110 (see FIG. 3) for braking the flywheel 74.

The brake wire 104 is bifurcated by a branch mechanism 111 in its course. A brake wire 104a on one side is extended toward the front forks 30R, 30L. A brake wire 104b on the other side is connected to the drum brake 110. At the branching portion of the brake wire 104, a part of an outer wire 112 is peeled, an end portion thereof is supported by a ring 114, and an exposed inner wire 116 is connected with two inner wires by press bonding, caulking, welding or the like. One of the two inner wires constitutes the brake wire 104a, and the other of the two inner wires constitutes the brake wire 104b. Therefore, when the brake lever 100R is operated, the two brake wires 104a and 104b are pulled simultaneously.

The brake wire 104a and the brake wire 102 cross each other in their course, and lower end portions thereof are connected to the pulleys 106R, 106L. When none of the brake wires 100L and 100R is pulled, the pulleys 106L and 106R are elastically biased by springs (not shown) so that projected portions 118L and 118R are directed upward. In this instance, the brake levers 100L and 100R are elastically biased by the pulleys 106L and 106R, to be separate from the steering handle 28.

With the brake levers 100L, 100R pulled toward the steering handle 28, the pulleys 106L, 106R are elastically rotated, whereby the projected portions 118L and 118R are directed downward. The pulleys 106L, 106R can be rotated until the projected portions 118L, 118R abut on stoppers 120L, 120R.

The rotation angles of the pulleys 106L, 106R can be detected by rotation sensors 108L, 108R, and signals of the angles detected are supplied to the controller 46. The controller 46 supplies the main control unit 18 with a signal according to the signals of the rotation angles of the pulleys 106L and 106R detected, in other words, the operation amounts of the brake levers 100L and 100R.

As shown in FIG. 3, the drum brake 110 is disposed concentrically with the flywheel 74. An arm 110a thereof is connected to an end portion of the brake wire 104b. The drum brake 110 is provided therein with a drum body, which is connected to and rotated as one body with the flywheel 74. When the brake lever 100L is operated and the brake wire 104b is thereby pulled, the arm 110a is inclined, a brake shoe in the inside is opened wider in the direction of the outside diameter to make contact with the drum body and generate a frictional force, and the flywheel 74 is braked.

In addition, as shown in FIG. 4, the steering angle sensor 50 is provided at a lower end portion of the head tube 20a. The steering angle sensor 50 detects the turning angle of the stem 28a supporting the steering handle 28. The microphone 52 is provided on the steering handle 28, and is close to the face of the rider, so that the rider's voice is clearly inputted. The steering angle sensor 50, the microphone 52 and the recession switch 54 are connected to the controller 46, and supply the controller 46 with a steering angle signal, a vocal signal and a switch operation signal, respectively.

Returning to FIG. 1, the mat switch 16 is composed of a left switch 150L and a right switch 150R, which are independent and are disposed at such positions that the rider can tread thereon with his feet while being astride the head tube 20a of the frame 20 when he gets off. Namely, the left foot treads on the left switch 150L, and the right foot treads on the right switch 150R. The left switch 150L and the right switch 150R are turned ON when trodden on, and supply ON signals to the controller 46.

Figure 5:
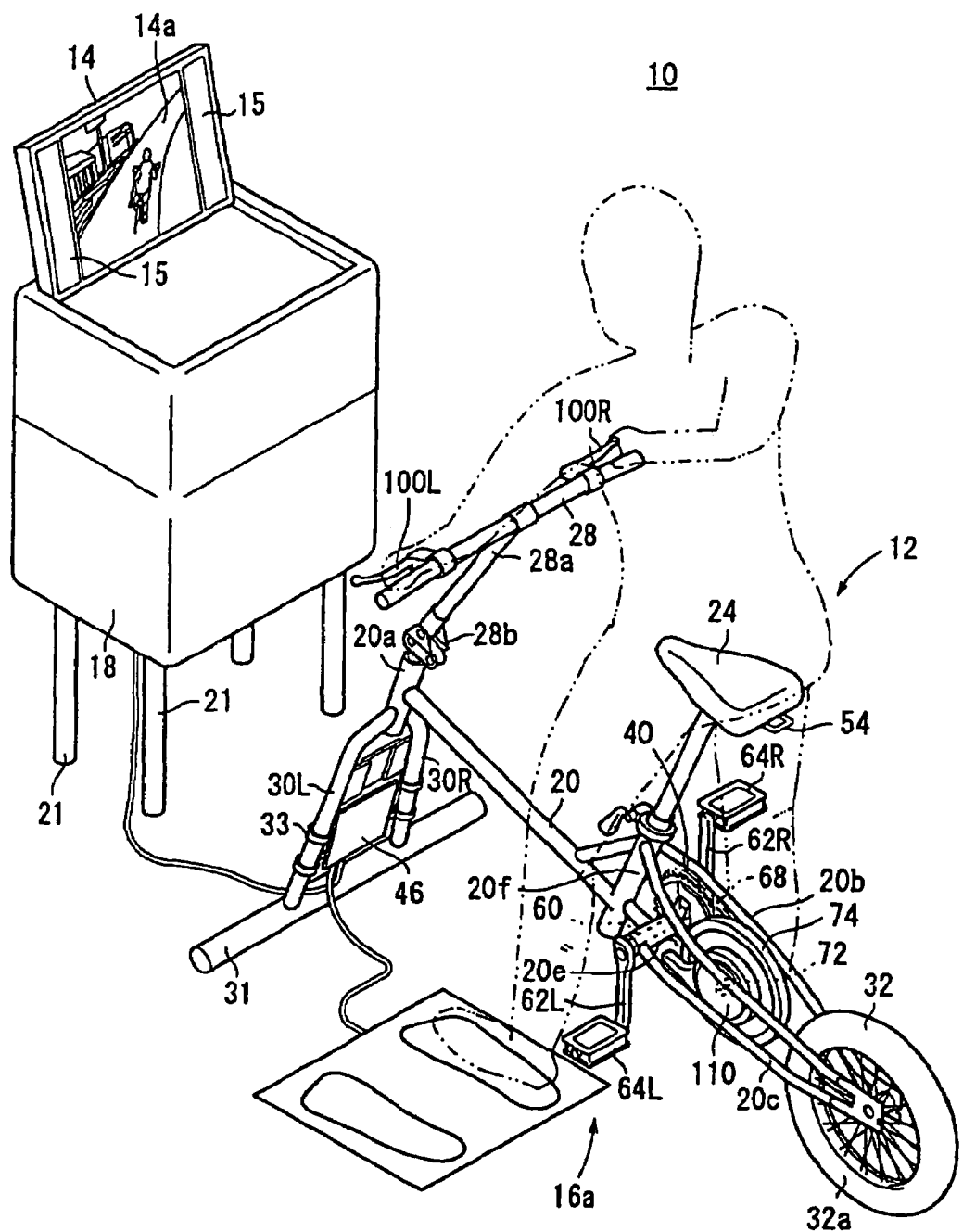
FIG. 5 is a perspective view of the bicycle simulation system in the case where an integral type mat switch is disposed on the left side of the dummy bicycle.

The left switch 150L and the right switch 150R are each in a thin mat-like form, having a backing rubber, longitudinal electrode wires and transverse electrode wires arranged in a lattice form opposite to the backing rubber. A soft insulating material is inserted between the backing rubber and a face rubber. The longitudinal electrode wires and the transverse electrode wires are connected to two output terminals (not shown), respectively. When the rider treads on the face rubber with his foot, the face rubber is elastically deformed while compressing the insulating material, whereon the longitudinal electrode wires and the transverse electrode wires make contact with each other at their intersecting locations. As a result, the two output terminals are put into conduction, and the switch is turned ON. When the foot is put off, the longitudinal electrode wires and the transverse electrode wires are separated from each other, and the switch is turned OFF. The mat switch 16 may not necessarily be of the left-right independent type; a mat switch 16a having two switches formed integrally as shown in FIG. 5 may be adopted, and may be disposed on the left side of the dummy bicycle 12, for example. With such a mat switch 16a, when the rider gets off the dummy bicycle 12 to the left side and steps down on the mat switch 16, a bicycle-pushing walking action in a walking mode which will be described later is more realistically realized.

Figure 6:
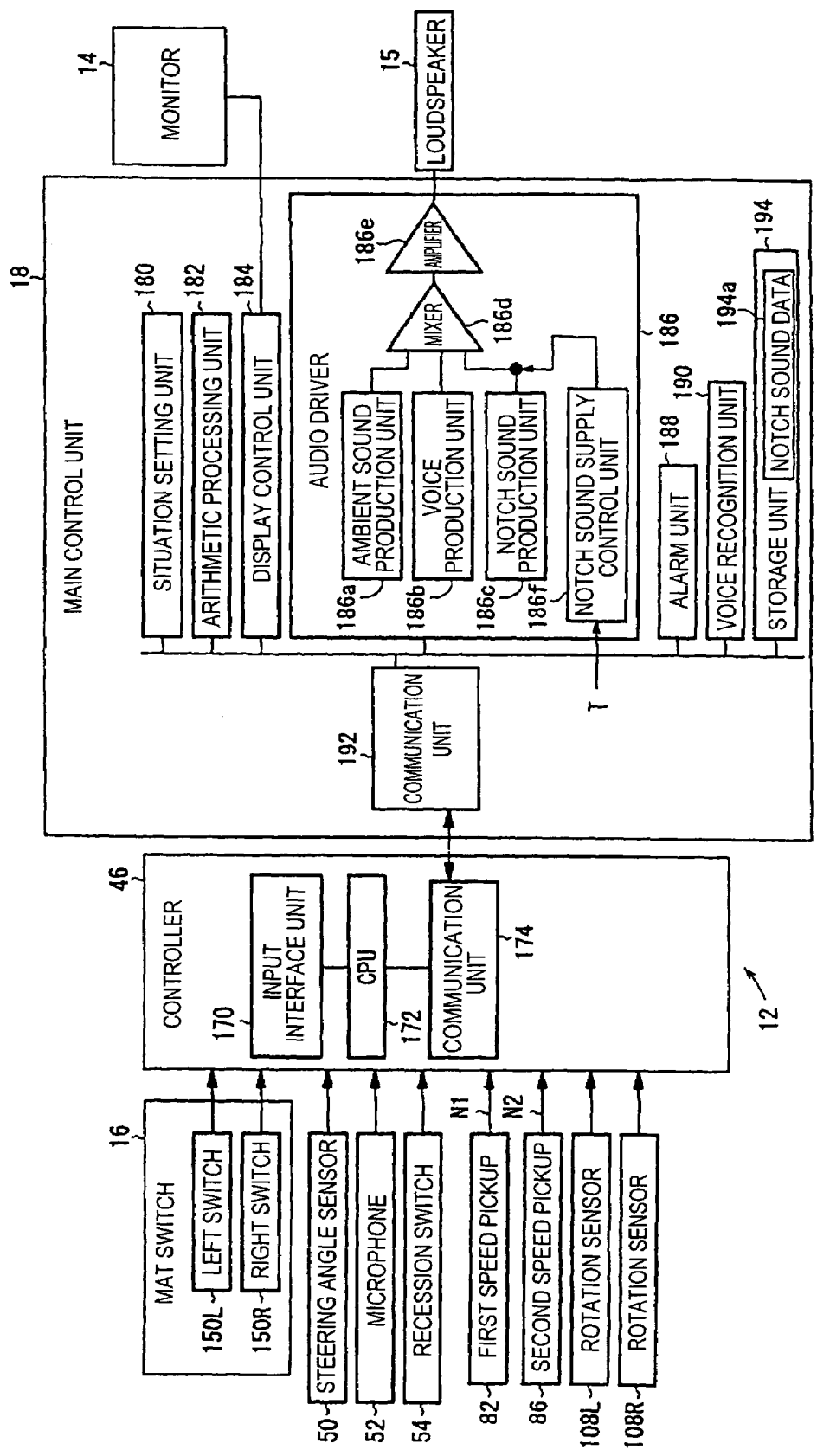
FIGS. 6 and 7 are block diagrams of electrical component parts of the bicycle simulation system.
Figure 7:
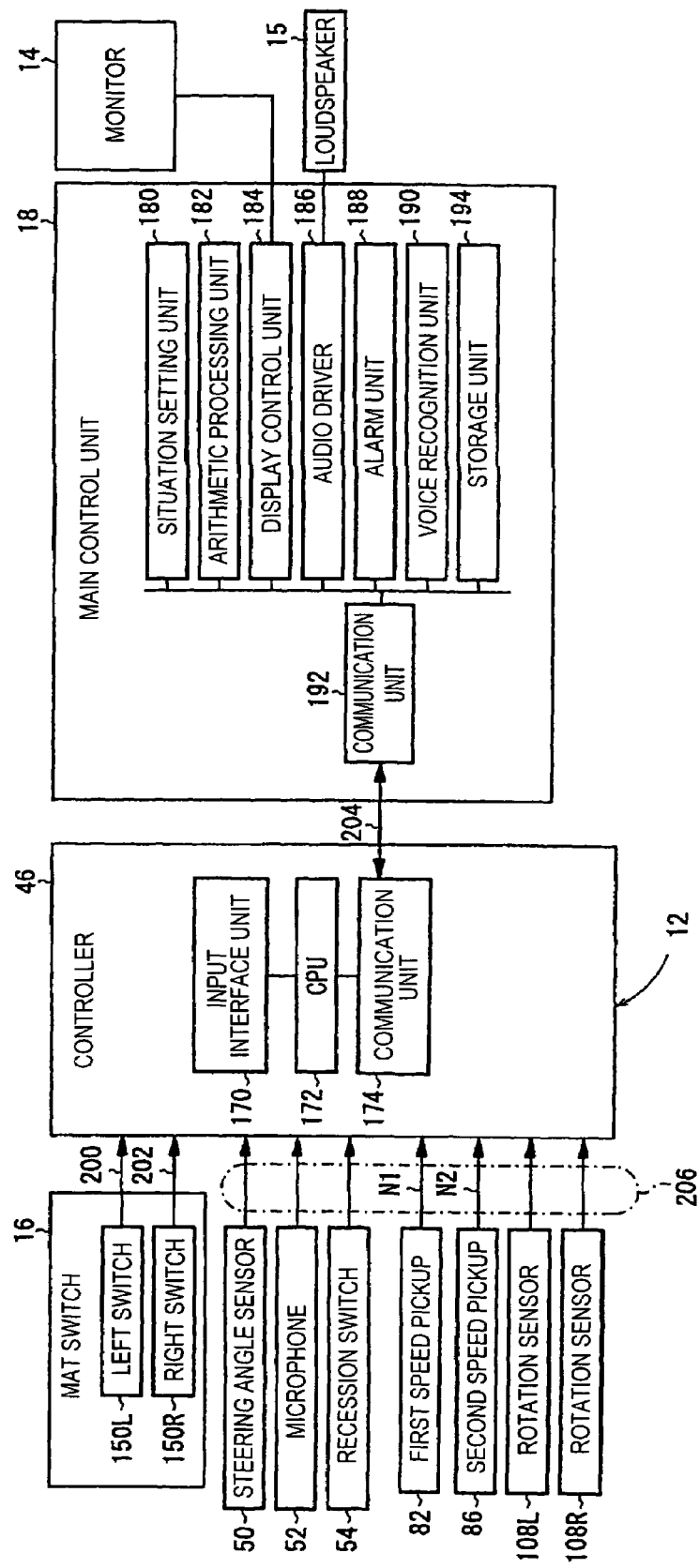

As shown in FIGS. 6 and 7, the controller 46 has an input interface unit 170, a CPU (Central Processing Unit) 172, and a first communication unit 174. The first communication unit 174 is connected to a second communication unit 192 of the main control unit 18, so as to perform real-time communication with the main control unit 18. The input interface unit 170 is connected with the steering angle sensor 50, the microphone 52, the first speed pickup 82, the second speed pickup 86, the rotation sensors 108L, 108R, the recession switch 54, the left switch 150L, and the right switch 150R, for inputting analog signals and digital signals.

The CPU 172 has a relaying action such as to process or convert the signals from the above-mentioned electrical component parts and transmit the processed or converted signals to the main control unit 18 via the first communication unit 174. For example, the CPU 172 obtains the rotation speed N1 of the flywheel 74 and the rotation speed N2 of the crankshaft 60 from the frequencies of the signals supplied from the first speed pickup 82 and the second speed pickup 86, multiplies the rotation speed N1 by a predetermined constant to obtain a simulated running velocity V, and supplies the rotation speeds to the main control unit 18.

The main control unit 18 has a situation setting unit 180 for setting a simulated cycling situation. An arithmetic processing unit (frequency setting unit) 182 executes an arithmetic process according to the running conditions. A display control unit 184 controls the display on the monitor 14. An audio driver (mimic sound generation unit) 186 provides an acoustic output for the loudspeaker 15. An alarm unit 188 issues predetermined alarms to the rider. A voice recognition unit 190 recognizes the voice inputted from the microphone 52. The second communication unit 192 controls the communication with the first communication unit 174. The main control unit 18 also has a rewritable storage unit 194. Notch sound data 194a obtained by preliminary digital recording of a notch sound generated by rotating a real one-way clutch is recorded in the storage unit 194.

In practice, the main control unit 18 has the CPU (Central Processing Unit) 172 as a control main body and a RAM (Random Access Memory), a ROM (Read Only Memory), an HD (Hard Disk) and the like as storage units. The functional units of the main control unit 18 shown in FIGS. 6 and 7 is so realized that the CPU reads a program recorded on the HD, and executes the program while cooperating with the ROM, the RAM and predetermined hardware.

The audio driver 186 has an ambient sound production unit 186a for generating a mimic ambient sound (air stream sounds, tire-road surface sound, Klaxon, etc.) generated according to the running situation. A voice production unit 186b generates the voice of an alarming or guiding person. A notch sound production unit 186c reads and stores the above-mentioned notch sound data 194a. A mixer 186d synthesizes the sound data supplied from the sound production units. An amplifier 186e amplifies the signal obtained by synthesis and supplies the amplified signal to the loudspeaker 15. In addition, the audio driver 186 has a notch sound supply control unit 186f for setting the interval of supply of the notch sound from the notch sound production unit 186c to the mixer 186d based on the frequency obtained from the arithmetic unit 182. While only one set of audio driver 186 and speaker 15 is shown in FIG. 5, a configuration corresponding to a stereo mode may also be adopted. The notch sound may be generated from another independent loudspeaker instead of through the mixer 186d.

Referring to FIG. 7, the controller 46 is connected to the left switch 150L, the right switch 150R, and the main control unit 18 by respectively independent connection wires 200, 202, and 204. The controller 46 is connected to the other electrical component elements by a collective harness 206 because the other component elements are provided in the dummy bicycle 12. As is clear from FIG. 4, the controller 46 is provided at a low position, and is near the left switch 150L and the right switch 150R, so that the connection wires 200 and 202 therebetween are set very short (see FIG. 1). In addition, since the controller 46 is provided on the front side of the dummy bicycle 12, the connection wire 204 therebetween is also set very short. This ensures an orderly appearance, an enhanced stability of the signals transmitted and an easy laying of the signal wires.

Now, a method of simulating the running of a bicycle by use of the bicycle simulation system 10 configured as above will be described below.

Figure 8:
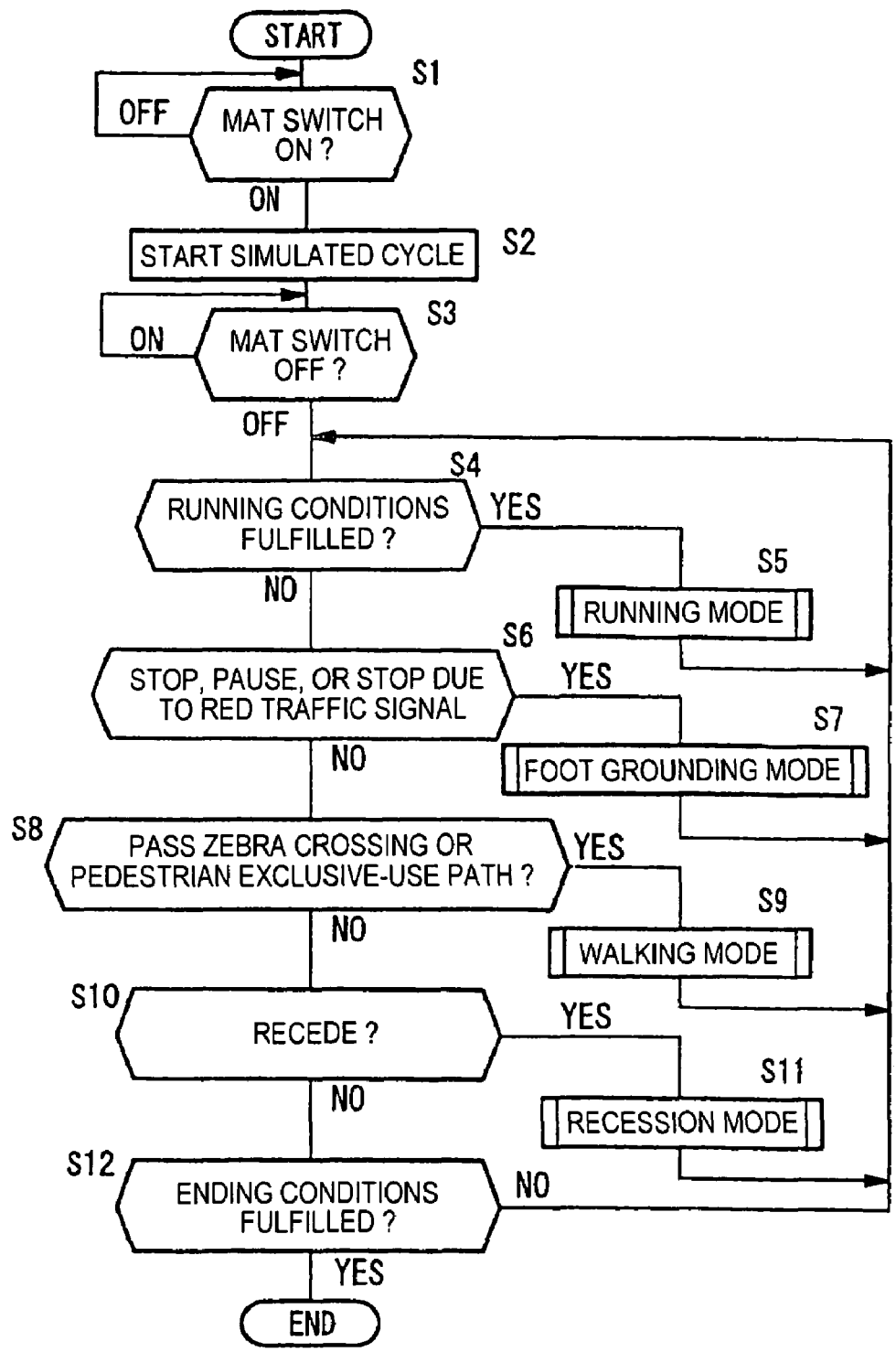
FIG. 8 is a flowchart of a main routine in a method of carrying out a simulated cycling by use of the bicycle simulation system.

In step S1 in FIG. 8, it is checked whether or not the mat switch 16 is turned ON. Specifically, when at least one of the left switch 150L and the right switch 150R of the mat switch 16 is turned ON, step S2 is entered, whereas when both of the switches are OFF, the control process stands by at step S1. In other words, when the rider stands on the mat switch 16, step S2 is automatically entered, and, until then, the control process stands by at step S1, and a predetermined power saving mode (for example, the monitor 14 is turned OFF) can be maintained.

In step S2, a simulated cycling is started, and a predetermined starting picture is displayed on the screen 14a. In the starting picture, an image of a bicycle at rest and an image of a person as the rider standing by the bicycle are displayed. In addition, the characters "A simulated cycling is going to be started. Please seat yourself on the saddle and work the pedals." are displayed on the screen 14a, or the voice of the same words is issued from the loudspeaker 15.

Thus, the simulated cycling can be automatically started by treading on the mat switch 16, and the simulated cycling can be started without need for a complicated operation and without any sense of incompatibility. It suffices for the rider to carry out operations according to the instructions issued from the screen 14a or the loudspeaker 15, so that a manual or the like is not needed, the operations are easy to carry out, and even children can perform the simulated cycling.

In step S3, it is checked whether or not the mat switch 16 is turned OFF. Specifically, when the left switch 150L and the right switch 150R are both turned OFF, step S4 is entered, whereas when at least one of the switches is ON, the control process stands by at step S3.

To be more specific, when the rider is seated astride the saddle 24 and puts his feet off the mat switch 16, step S4 is automatically entered, and an actual running in the simulated cycling can be started. In this instance, the starting picture is ended, and an image of the bicycle and an image of the person riding on the bicycle are displayed.

In step S4, it is checked whether or not predetermined running conditions are fulfilled. When the running conditions are fulfilled, a running mode in step S5 is entered, whereas when the running conditions are not fulfilled, step S6 is entered. The running mode is a mode in which the rider seated on the saddle 24 works the pedals 64L and 64R and manipulates the steering handle 28 so as to perform a simulated running. In this case, a scene varied according to a simulated running velocity V and a steering angle obtained based on the first speed pickup 82 and the steering angle sensor 50 is displayed on the screen 14a (see FIG. 1). In the running mode, it is recommendable to issue a predetermined alarm in a situation where the simulated running velocity V is not less than a prescribed velocity, a situation where the virtual bicycle has stepped out of a virtual road, or a like situation. In addition, in the running mode, a notch sound is generated from the loudspeaker 15, based on the frequency T set by the arithmetic processing unit 182. The procedure for generating the notch sound will be described later.

In step S6, it is checked whether or not the situation of the simulated cycling is a stop, a pause, or a red traffic signal. In the cases of a stop, pause or red traffic signal, a foot grounding mode in step S7 is entered; in other cases, step S8 is entered. In the foot grounding mode, the rider operates the brake levers 100L, 100R to bring the simulated running velocity V to 0, thereafter gets off the dummy bicycle, and treads on the mat switch 16. As a result, a scene in which the rider and the bicycle are at rest in the presence of a red traffic signal is displayed on the screen 14a. The foot grounding mode is canceled when the traffic signal is changed from red to green, or when confirmation of safety on the left and the right is made assuredly, on the basis of the situation in the simulated running.

In step S8, it is checked whether or not the situation in the simulated cycling is the case of passing a pedestrian priority path such as zebra crossing or a pedestrian exclusive-use path such as footpath. In the case of passing a pedestrian priority path or a pedestrian exclusive-use path, a walking mode in step S9 is entered; in other cases, step S10 is entered. The walking mode is a mode for the rider to walk while pushing the bicycle along a pedestrian exclusive-use path or the like, for example, a mode for learning to walk while pushing the bicycle so as not to trouble other pedestrians or the like. In this case, the rider gets off the dummy bicycle 12 and stamps on the mat switch 16, whereby the walking conditions are reproduced, and a corresponding scene is displayed on the screen 14a of the monitor 14.

In step S10, it is checked whether or not the situation in the simulated cycling is a situation of moving the bicycle backward. In the case of backward movement (recession), a recession mode in step S11 is entered; in other cases, step S12 is entered. The recession mode is a mode in which the rider having got off the bicycle recedes while pushing the bicycle. In this case, the rider gets off the dummy bicycle 12, and stamps on the mat switch 16 while turning ON the recession switch 54, whereby the receding conditions are reproduced, and a corresponding scene is displayed on the screen 14a of the monitor 14.

In step S12, it is checked whether or not predetermined end conditions are fulfilled. When the end conditions are fulfilled, the simulated cycling is ended, whereas when the conditions are not fulfilled, the control process returns to step S4, and the simulated cycling is continued. The control process returns to step S4 also after the processing in each of steps S5, S7, S9 and S11 is finished.

In the case of ending the simulated cycling, it is checked whether or not the mat switch 16 is turned ON, like in step S1. In this case, based on the condition where the mat switch 16 is turned ON, it can be detected that the rider has got off the dummy bicycle 12. Based on this, the simulated cycling ends, and the system returns into a stand-by state such as a predetermined power saving mode. When there is no operation of the dummy bicycle 12 in a predetermined period after the mat switch 16 is turned OFF in step S2, it is considered that the rider has once trodden on the mat switch 16 but has walked away without riding on the dummy bicycle 12. In this case, the system returns into the stand-by state.

Figure 9:
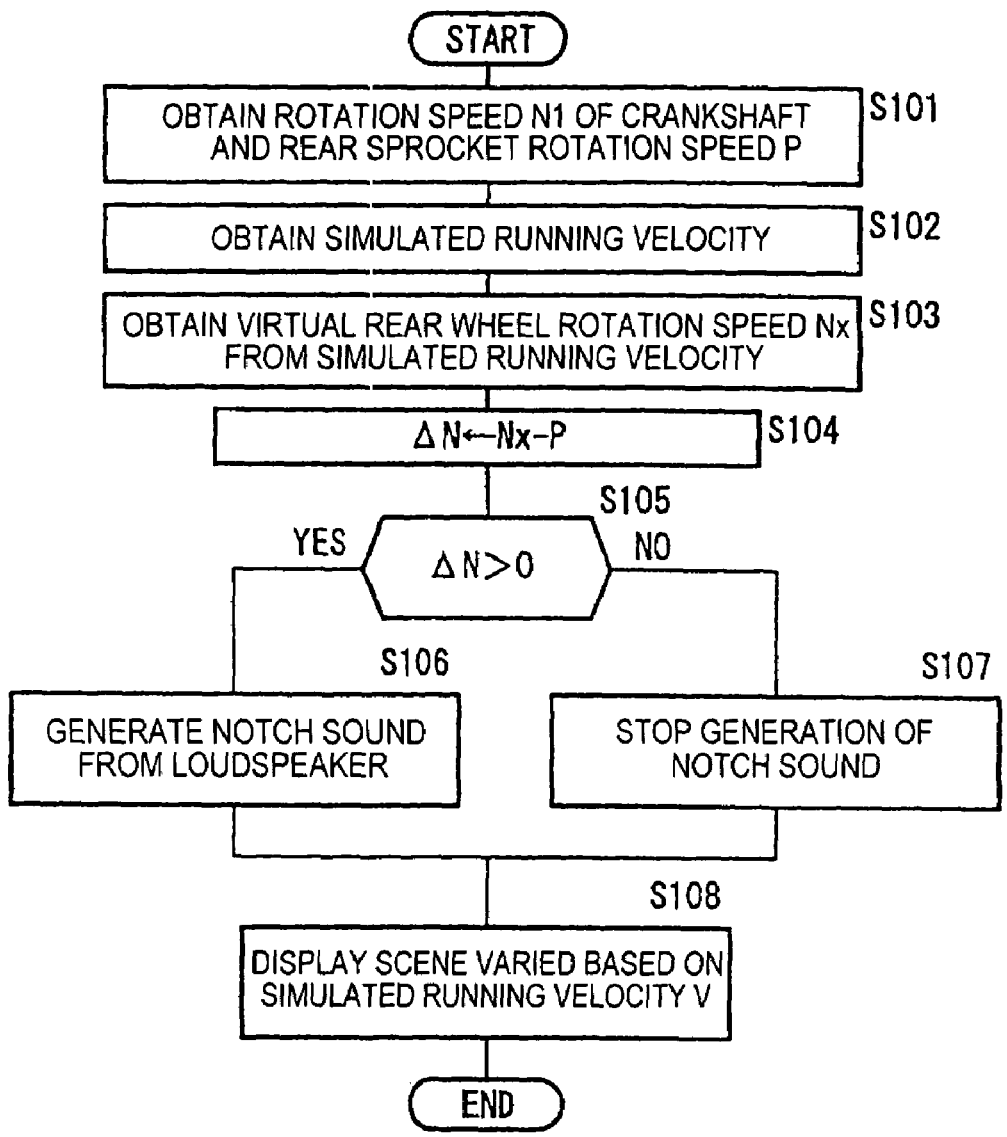
FIG. 9 is a flowchart showing the procedure of generating a notch sound.

The procedure for generating a notch sound from the loudspeaker 15 based on the frequency T set by the arithmetic processing unit 182 in the running mode will be described below, referring to FIGS. 9-13. The process shown in FIG. 9 is repeatedly executed on the basis of a very short predetermined time by the arithmetic processing unit 182 and the audio driver 186 in the main control unit 18.

First, in step S101, the rotation speed N2 of the crankshaft 60 is determined based on a signal obtained from the first speed pickup 82, and is multiplied by the gear ratio R to determine the rear sprocket rotation speed P as P←N2×R.

In step S102 (simulated velocity setting unit), a simulated running velocity V is obtained based on a predetermined subroutine process (see FIG. 8). This process will be described later.

In step S103, the rotation speed Nx of a virtual rear wheel is obtained based on the simulated running velocity V, as Nx←V/A, where constant A is a value determined according to the rear wheel diameter of a real bicycle assumed.

In step S104, the rear sprocket rotation speed P is subtracted from the rotation speed Nx to obtain a differential rotation speed ΔN as ΔN←Nx−P.

In step S105, it is judged whether the sign of the differential rotation speed ΔN is positive or negative. When ΔN>0, step S106 is entered, whereas when ΔN≦0, step S107 is entered.

In step S106, the audio driver 186 generates, from the loudspeaker 15, a notch sound produced by the notch sound production unit 186c based on the frequency T supplied from the arithmetic processing unit 182. The frequency T is obtained as T←ΔN×Kc, where constant Kc is the number of times of notch sound generation per one revolution of the one-way clutch of the rear wheel assumed in a real bicycle. For example, constant Kc is set at any one value in the range of 12 to 36. After step S106, a step 108 is entered.

Since the one-way clutch 72 is covered with the cover 75 as above-mentioned, the actually generated notch sound is rarely audible to the rider, and the notch sound at the frequency T generated in this step S106 is heard.

In step S107, a predetermined control signal is supplied to the notch sound supply control unit 186f, so as to stop the generation of the notch sound.

In step S108, based on the simulated running velocity V, a varying scene is displayed on the screen 14a under the action of the display control unit 184. The displayed scene is varied according to the simulated running velocity V; specifically, a flow at a higher velocity is displayed as the simulated running velocity V is higher. After this step S108, the present-time process shown in FIG. 7 is ended.

Next, the process of determining the simulated running velocity V in step S102 mentioned above will be described referring to FIG. 10.

First, in step 201, the rotation speed N1 of the flywheel 74 is determined based on a signal obtained from the second speed pickup 86.

In step S202, a first formal parameter V1 for determining the simulated running velocity V is obtained as V1←N1×A+Kb, where variable Kb is a deceleration shift (m/s) due to braking, which is obtained by the rotation sensors 108L and 108R.

In step S203, it is checked whether or not the first formal parameter V1 is V1<0. When V1<0, a setting of V1←0 is conducted (step S204), whereby the first formal parameter V1 is so regulated as not to be a negative value.

In step S205, taking into account the precedent-time simulated running velocity V0 and simulates environments, a second formal parameter V2 for determining the simulated running velocity V is obtained as V2←V0+K1+K2, where variable K1 is an incremental or decremental shift (m/s) due to the road surface inclination. Variable K2 is an incremental or decremental shift (m/s) due to environmental factors such as wind.

The variables K1 and K2 are obtained and set as data on the present situations of simulated cycling, from the situation setting unit 180. For example, they are set to 0 as a reference corresponding to the running on a level ground in the absence of wind. When running on a slope, a setting of K1←K1+t×s is made, where variable t is a slope running time, while variable s has an absolute vale increased with the slope inclination degree, its sign being positive in the case of a descending slope and being negative in the case of an ascending slope.

In addition, variable K2 is set according to the wind assumed on the basis of the simulated cycling. Specifically, the constant K2 is set at 0 in the absence of wind, is set to be a positive value increased with the wind velocity in the case of a favorable wind, and is set to be a negative value having an absolute value increased with the wind velocity in the case of an adverse wind.

In step S206, it is checked whether or not the second formal parameter V2 is V2<0; when V2<0, step S207 is entered, whereas when V2≧0, step S208 is entered.

In step S207, the second formal parameter V2 is treated taking a braking operation into account; specifically, an addition V2←V2+Kb is conducted, and step S209 is entered. On the other hand, in step S208, a subtraction V2←V2−Kb is conducted, and step S210 is entered.

In step S209, it is checked whether or not the second formal parameter V2 is V2>0. When V2<0, a setting of V2←0 is conducted (step S211), whereby the second formal parameter V2 is so regulated as not to be a negative value. When V2≧0, step S212 is entered.

In step S210, it is checked whether or not the second formal parameter V2 is V2>0. When V2>0, a setting of V2←0 is conducted (step S211), whereby the second formal parameter V2 is so regulated as not to be a positive value. When V2≦0, step S212 is entered. A comparing process in step S210 is a process of taking into account the case of backward movement due to an ascending slop or an adverse wind. The regulation of V2←0 when V2>0 is for excluding a forward movement by a brake operation greater than the backward movement causing load.

In step S212, the first formal parameter V1 and the second formal parameter V2 are compared with each other. When V1≧V2, step S213 is entered, in which the simulated running velocity V is set as V←V1. When V1<V2, step S214 is entered, in which the simulated running velocity V is set as V←V2. Specifically, in the case where V<0, a mis-matching to the pedal motion occurs, and, therefore, only a positive value is taken into consideration.

Furthermore, in step S215, the updated simulated running velocity V is stored in a predetermined storage unit, to be served to utilization as the simulated running velocity V0 in step S205 at the time of the next-time process.

The rotation speed of the flywheel 74 at a predetermined simulated running velocity V and the rotation number of the rear wheel at the same running velocity in a real bicycle do not always accord with each other, and the frequency of the notch sound of the one-way clutch 72 may be felt unnatural by the rider. In view of this, in the bicycle simulation system 10, the differential rotation speed ΔN is multiplied by the constant Kc, so as to obtain a frequency T which can be felt without a sense of incompatibility by the rider.

Furthermore, since the variables K1 and K2 are values varied according to the situation of the simulated cycling, with the variables K1 and K2 used, the frequency T is determined while taking into account other forces than the force exerted on the pedals, i.e., gravity in the case of a slope and wind pressures. The frequency T thus obtained is supplied to the notch sound supply control unit, to make effective the notch sound generation process.

Figure 10:
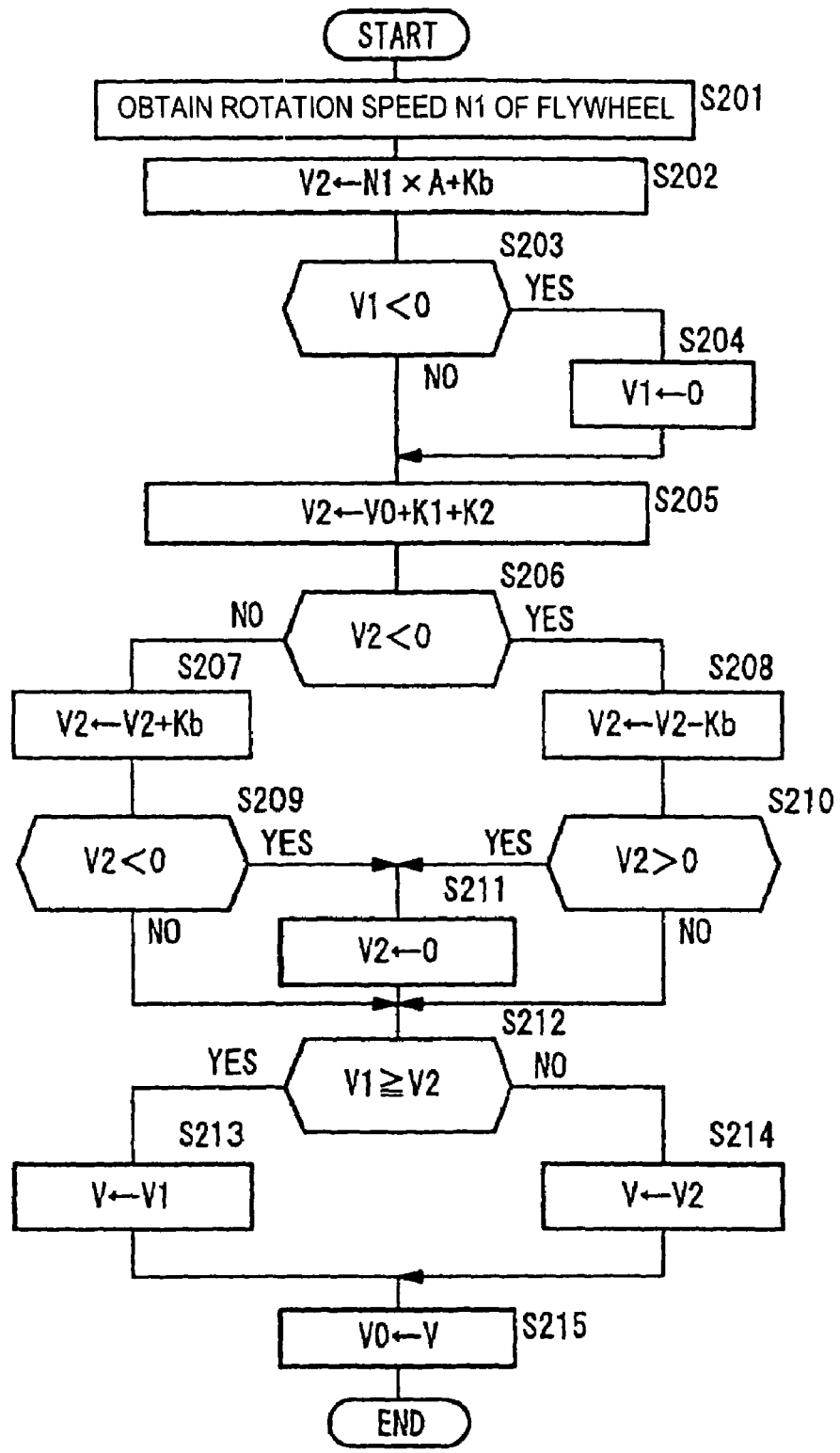
FIG. 10 is a flowchart showing the procedure of obtaining a simulated running velocity.

The process shown in FIGS. 9 and 10 has been described to be executed in the running mode, a similar process may be executed in a walking mode. In the walking mode, the time interval in the rider's treading on the mat switch 16 may be deemed as a walking velocity, irrespectively of the rotation speed N1, and the walking velocity may be deemed as the simulated walking velocity V (simulated velocity setting unit). In this case, the frequency T is obtained as T←V×Kc/A (frequency setting unit), and by supplying the frequency T to the audio driver 186, a notch sound at a comparatively low frequency generated when the rider walks while pushing the bicycle can be generated from the loudspeaker 15.

Next, a first modified process of the notch sound generation process will be described referring to FIG. 11. This process can be substituted for the process shown in FIGS. 9 and 10.

Figure 11:
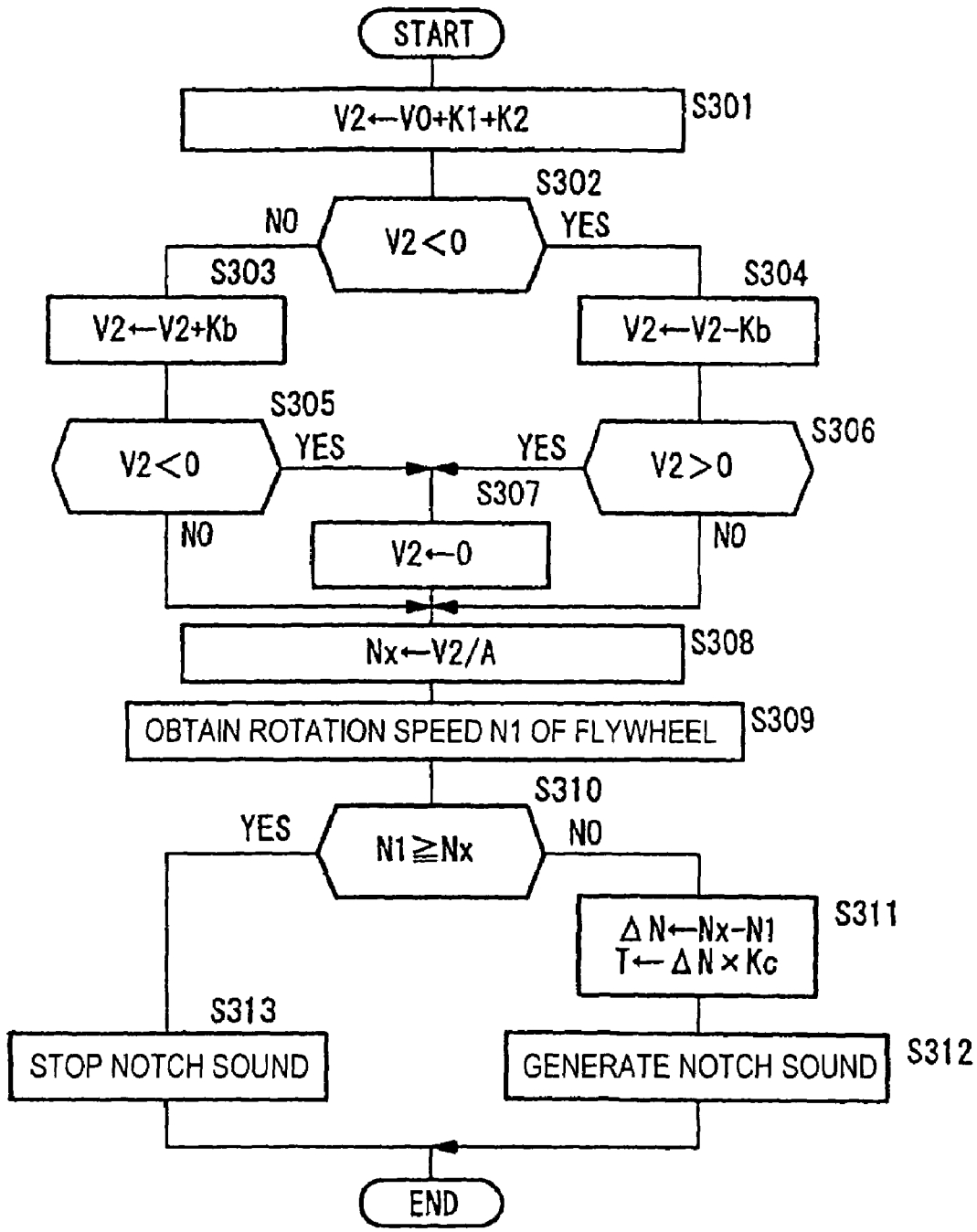
FIG. 11 is a flowchart of a first modified example of the procedure of generating a notch sound.

The process ranging from step S301 to S307 shown in FIG. 11 is the same process as that of steps S205 to S211 above.

After step S307, in step S308, the rotation speed Nx of a virtual rear wheel is obtained as Nx←V2/A.

In step S309, the rotation speed N1 of the flywheel 74 is determined based on a signal obtained from the second speed pickup 86.

In step S310, the rotation speed N1 of the flywheel 74 is compared with the rotation speed Nx of the virtual rear wheel. When N1<Nx, step S311 is entered, whereas when N1≧Nx, step S313 is entered.

In step S311, the differential rotation speed ΔN is obtained as ΔN←Nx−N1, and the frequency T is obtained as T←ΔN×Kc. Thereafter, in step S312, a notch sound is generated in the same manner as in step S106.

On the other hand, in step S313, generation of a notch sound is stopped in the same manner as in step S107.

According to the process shown in FIG. 11, the need for the second speed pickup 86 for detecting the rotation of the crankshaft 60 is eliminated, which simplifies the configuration and alleviate the processing load for control.

Next, a second modified process of the notch sound generation process will be described referring to FIGS. 12 and 13. This process can be substituted for the process shown in FIGS. 9 and 10.

In the second modified process, two sensors 86a and 86b (see FIG. 13) corresponding to the second speed pickup 86 are provided in parallel so that whether rotation of the crankshaft 60 is in the normal direction or in the reverse direction can be recognized by the order of detection of the detected rotor 88. A control taking the rotational direction into account is performed. A rotation speed with a sign of rotational direction detected by the two sensors 86a and 86b is represented as a rotation speed $N2_s$, in distinction from the no-sign rotation speed N2 used above.

Figure 12:
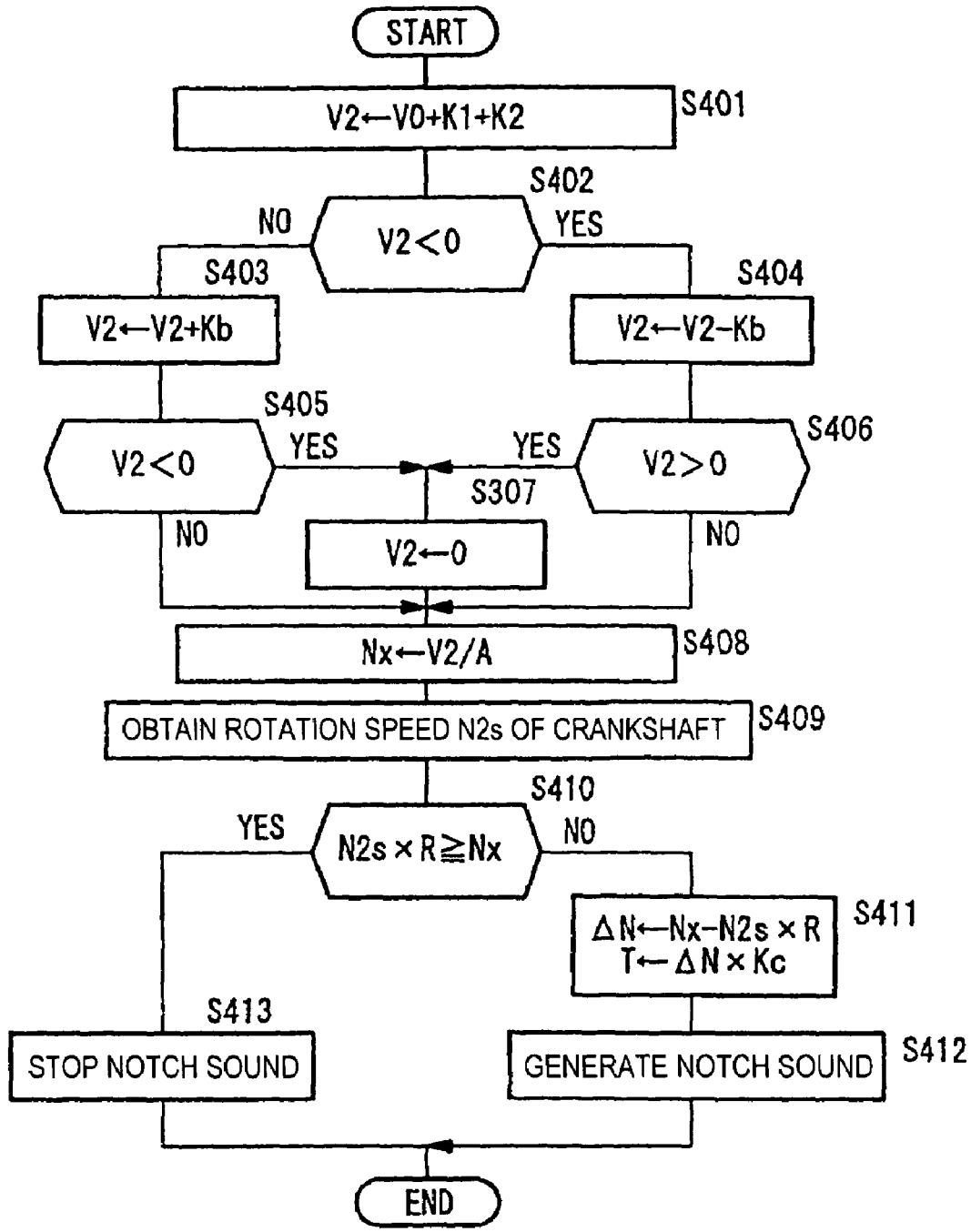
FIG. 12 is a flowchart of a second modified example of the procedure of generating a notch sound.
Figure 13:
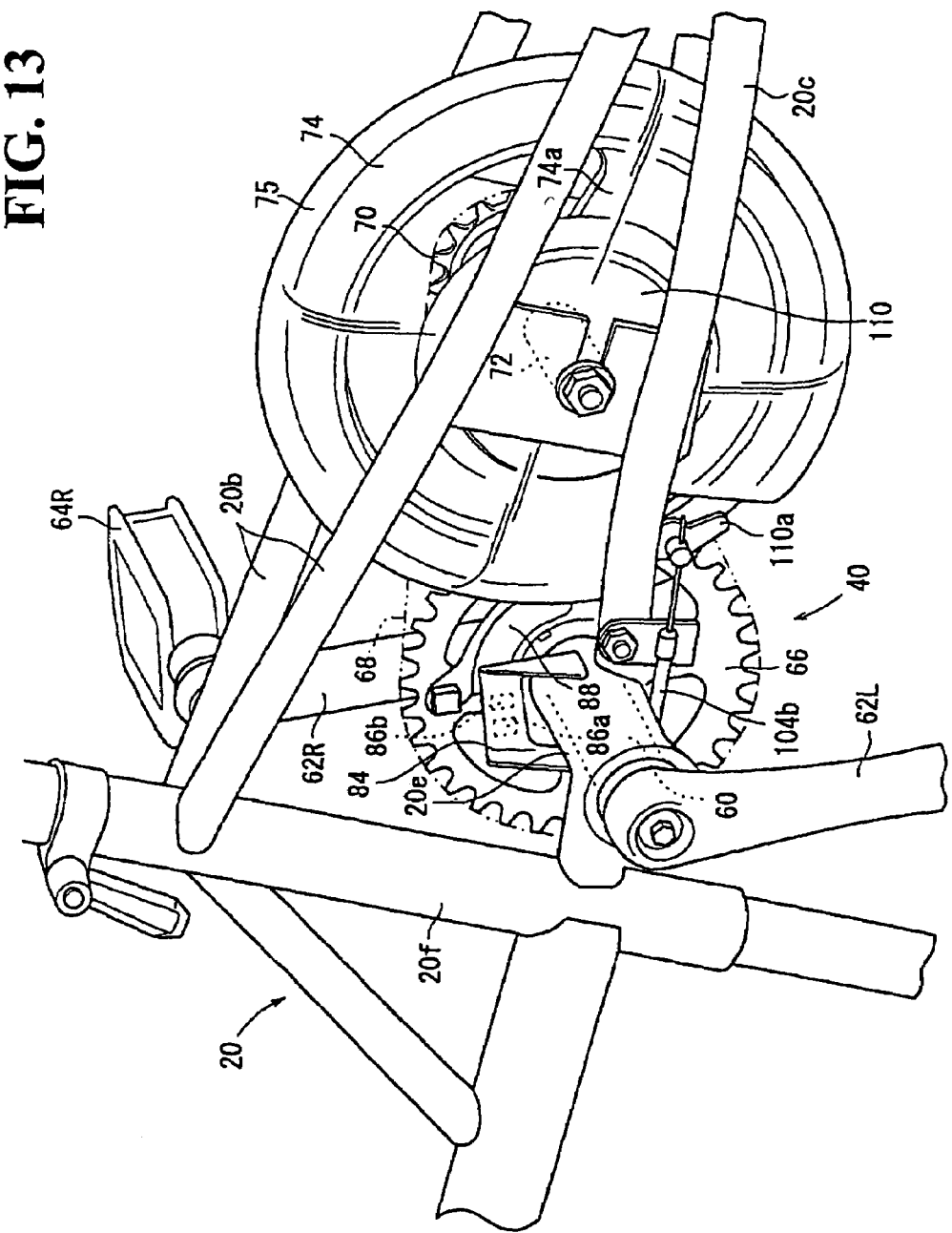
FIG. 13 is a perspective view of a rotation drive mechanism unit in which two rotation sensors for the crankshaft are arranged in parallel, and the vicinity thereof.

Steps S401 to S408 in FIG. 12 constitute the same process as that of steps S301 to S308 above.

After step S408, in step S409, the rotation speed $N2_s$ of the crankshaft 60 is obtained from the sensors 86a and 86b.

In step S410, the product $N2_s$×R of the rotation speed $N2_s$ and the gear ratio R is compared with the rotation speed Nx, and when N2s×R<R, step S411 is entered, whereas when N2s×R≧Nx, step S413 is entered.

In step S411, the differential rotation speed ΔN is obtained as ΔN←Nx−$N2_s$×R, and the frequency T is obtained as T←ΔN×Kc. Thereafter, in step S412, a notch sound is generated in the same manner as in step S106.

On the other hand, in step S413, generation of a notch sound is stopped in the same manner as in step S107.

According to the process shown in FIG. 12, a more appropriate notch sound can be generated, taking the rotational direction of the crankshaft 60 into account.

As has been described above, according to the bicycle simulation system 10, the driver can visually feel like actually cycling by riding the dummy bicycle 12, because of his own operations on the pedals 64L, 64R and the external forces, such as gravity and wind pressures, generated due to the situation settings. In addition, the rider can experience the feeling of real cycling sounds, since the notch sound according to the simulated running velocity V and the rotation of the crankshaft 60 is generated from the loudspeaker 15. To be more specific, in the case of running on a level ground in the absence of wind, a notch sound is generated based on the operation speed of the pedals 64R, 64L, i.e., the rotation speed N2 of the crankshaft 60 and the rotation speed N1 of the flywheel 74. The frequency T of this notch sound is different from the frequency of the actual notch sound generated by the one-way clutch 72; namely, since the constant Kc is taken into account, the frequency T of this notch sound is not that according to the rotation speed N1 of the flywheel 74 but is the frequency based on the rotation speed of the rear wheel of a real bicycle under the same conditions, and, therefore, the notch sound is heard as a sound with reality.

In this case, a sound like "tick-tack-tick" at a high frequency is generated when the pedals 64R, 64L are not worked, and a sound like "tick, tack, tick" at a low frequency is generated when the pedals 64R, 64L are worked slowly. When the pedals 64R, 64L are worked fast with the result that ΔN=0, a ratchet mechanism inside the one-way clutch 72 is engaged, resulting in that the drive force is effectively transmitted to the flywheel 74 (the rear wheel, on assumption in the simulation). In this case, the condition corresponds to steps S109 and S110, and the generation of the notch sound is stopped in the same manner as in the case of a real bicycle, whereby realism is further enhanced. When the brake lever 100L is operated in the condition where the working on the pedals 64L, 64R is stopped, the rotation speed N1 of the flywheel 74 is lowered, so that the frequency of the notch sound being generated is also lowered, again in the same manner as in the case of a real bicycle.

In an assumed situation where the running velocity V is varied due to external forces such as gravity at a slope and wind pressures, the frequency T is determined taking the variables K1 and K2 into account, whereby the notch sound generated from the loudspeaker 15 becomes a natural sound according to the assumed situation. Therefore, the velocity visually felt due to the variations in the changing speed of the scene displayed on the screen 14a in correspondence with the simulated running velocity V and the velocity aurally felt due to the notch sound generated from the loudspeaker 15 accord with each other, whereby a sense of incompatibility is precluded.

Figure 14:
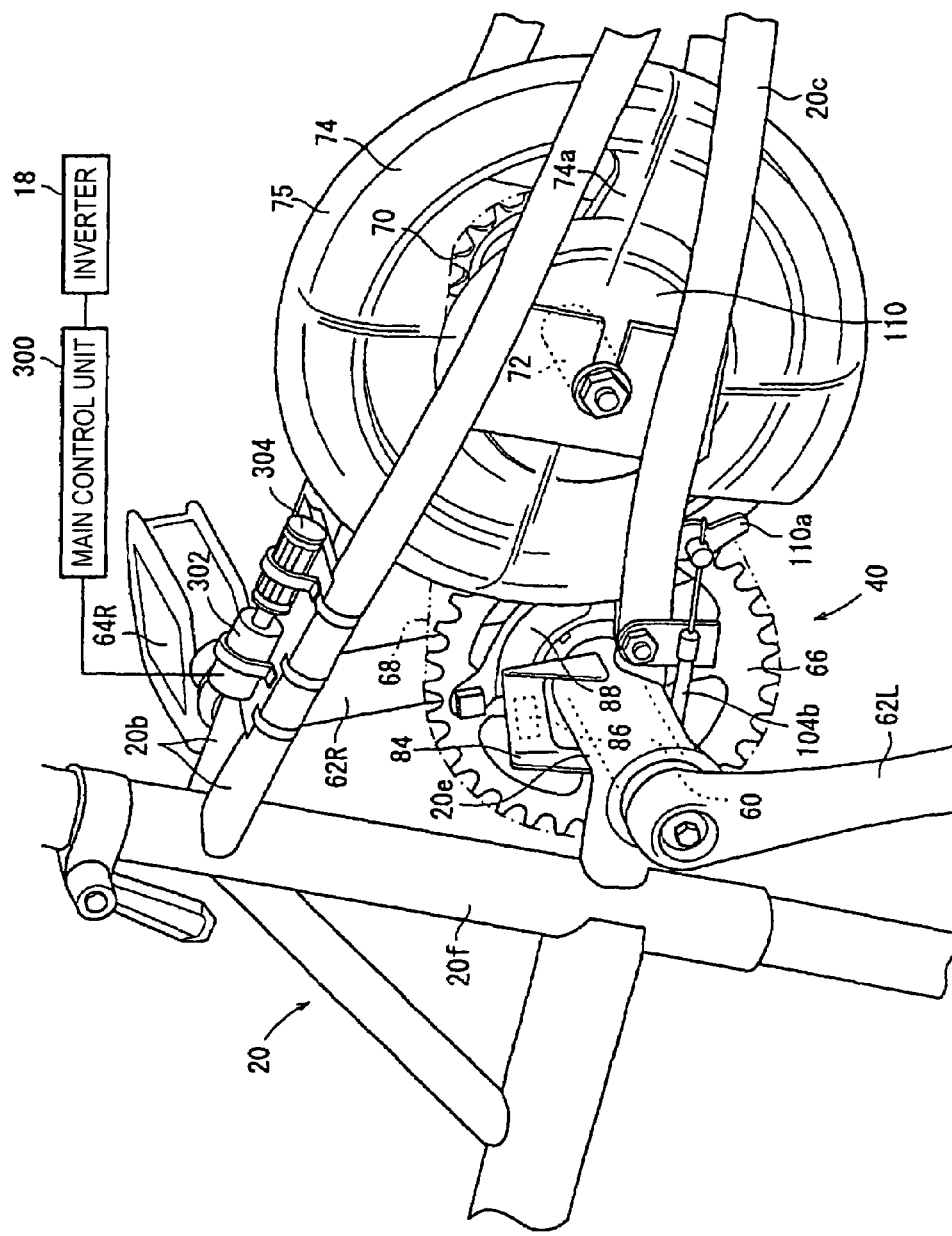
FIG. 14 shows a mechanism for generating a notch sound by rotating a one-way clutch by a motor.

Incidentally, the notch sound generated is not limited to the notch sound generated from the loudspeaker 15 by an electronic means but may be generated mechanically. For example, it suffices that, as shown in FIG. 14, an inverter 300 and a motor 302 under control of the main control unit 18 are provided. The inverter 300 controls the rotation speed, whereby the motor 302 and the one-way clutch 304 are rotated at a predetermined speed. As a result, the same effect as that of the electronic means of generating a notch sound from the loudspeaker 15 can be obtained. Since the real one-way clutch 304 generates the sound, a more realistic feeling can be obtained. In addition, the audio driver 186 is simplified in configuration. In this case, it is recommendable to contain the inverter 300 and the motor 302 inside the cover 75 or the like so as to shield the sound generated. In this case, though the sound generated by the one-way clutch 304 is a real notch sound, it is not a sound generated from the rear wheel in itself. In this meaning, it is a mimic sound on a simulation basis.

As has been described above, according to the bicycle simulation system 10 in this embodiment, the controller 46 is provided not on a turnable portion such as the steering handle 28 but on the fixed frame 20, whereby the sense of riding is similar to that in riding a real bicycle. While a real bicycle provides a lighter operation of a steering handle than that of a motorcycle or the like, the arrangement of the controller 46 on the frame 20 ensures that no load is exerted on the steering handle 28, and a light sense of operating a steering handle similar to that on a real bicycle is realized.

The steering handle 28 is a characteristic portion on the basis of appearance of the bicycle, not only as viewed from the rider seated astride the saddle 24 but also as viewed from a distance, and the arrangement of the controller 46 on the front forks 30L, 30R provides an appearance similar to that of a real bicycle, whereby realism is enhanced.

In addition, since the controller 46 is provided on the front forks 30L and 30R functioning as a front stand, of the frame 20, the controller 46 would not easily appear in the visual field of the rider, and does not spoil the appearance. Since the controller 46 is provided at a low position, the center of gravity of the dummy bicycle 12 is low. Particularly, since the dummy bicycle 12 is light in weight, the center of gravity is set at a comparatively low position due to the position of the controller 46, so that the rider can perform the simulation in a stable condition.

Furthermore, in view of the arrangement of the monitor 14 on the front side of the rider, the main control unit 18 for displaying a picture on the monitor 14 is also disposed on the front side of the dummy bicycle 12; in this case, by providing the controller 46 at the front forks 30L, 30R, the connection wire 204 for connection between the controller 46 and the main control unit 18 is set short. Therefore, stability of signals transmitted is enhanced, and the signal wires can be easily laid.

Since the dummy bicycle 12 is simple in configuration, there are few dead spaces corresponding to a fuel tank portion, an engine portion and a portion under a seat in a dummy vehicle in a motorcycle simulator. However, the vicinity of the front forks 30L, 30R would be a dead space where no other special component parts are present. Therefore, even the comparatively large controller 46 can be disposed there, without influencing the layout of other component parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle simulation system comprising:
a dummy bicycle, said dummy bicycle including:
a steering handle for being operated by a rider;
a left-right pair of pedals for being operated by the rider;
a flywheel operating in conjunction with the pedals so as to exert an appropriate load on the pedals, the flywheel being rotatably drivable by a one-way clutch;
a frame that turnably supports said steering handle and said pedals; and
a controller, said controller being provided on said frame; and
a mimic sound generation unit connected to the controller, wherein the mimic sound generation unit is configured to generate a mimic sound based on a first frequency, the first frequency being different from a second frequency of an actual sound generated by the one-way clutch,
wherein the first frequency is obtained based on a rotation speed of the flywheel and a rotation speed of a crankshaft on which the pedals rotate.

2. The bicycle simulation system according to claim 1, wherein said frame includes a stand as a support member provided at a lower portion of said steering handle, and said controller is provided at said stand.

3. The bicycle simulation system according to claim 1, further comprising a mat switch provided for detecting treading on a floor by a foot or feet of the rider, said mat switch being connected to said controller.

4. A bicycle simulation system comprising:
a dummy bicycle, said dummy bicycle including:
a steering handle for being operated by a rider;
a left-right pair of pedals for being operated by the rider;
a frame that turnably supports said steering handle and said pedals; and
a controller, said controller being provided on said frame; and
a display unit,
wherein said controller relays a signal from a predetermined electric apparatus to said display unit, and
wherein said dummy bicycle further comprises:
a rotary body that is rotated in conjunction with the operation of said left-right pair of pedals;
a first speed sensor that detects the rotation speed of said rotary body;
a second speed sensor that detects the rotation speed of a crankshaft on which said left-right pair of pedals rotate;
a simulated velocity setting unit for determining a simulated running velocity based on the rotation speed of said rotary body detected by said first speed sensor, said display unit displaying a scene based on the simulated running velocity;

a frequency setting unit that determines a frequency by multiplying a difference between a sprocket rotation speed that is obtained by multiplying the rotation speed of the crankshaft detected by the second speed sensor by a predetermined gear ratio and a virtual rear wheel rotation speed obtained from said simulated running velocity by a coefficient; and a mimic sound generation unit for generating a mimic sound based on the frequency.

5. The bicycle simulation system according to claim 4, wherein the mimic sound is a sound obtained by recording a notch sound generated by a one-way clutch.

6. The bicycle simulation system according to claim 4, wherein said mimic sound generation unit stops generating the mimic sound when the sprocket rotation speed is not less than the virtual rear wheel rotation speed.

7. The bicycle simulation system according to claim 4, wherein said simulated velocity setting unit varies the simulated running velocity according to a slope inclination degree when the situation in a simulated riding assumed is a slope.

8. A bicycle simulation system comprising:
a dummy bicycle, said dummy bicycle including:
a steering handle for being operated by a rider;
a left-right pair of pedals for being operated by the rider;
a frame that turnably supports said steering handle and said pedals; and
a controller, said controller being provided on said frame; and
a display unit,
wherein said controller relays a signal from a predetermined electric apparatus to said
display unit, and
wherein said dummy bicycle further comprises:
a speed sensor that detects the rotation speed of a crankshaft on which said left-right pair of pedals rotate;
a simulated velocity setting unit that sets a simulated running velocity, said display unit displaying a scene varied in correspondence with the simulated running velocity;
a frequency setting unit that determines a frequency proportional to a positive value, when a value obtained by subtracting the rotation speed of said crankshaft multiplied by a coefficient from said simulated running velocity is a positive value; and
a mimic sound generation unit for generating a mimic sound based on the frequency.

9. The bicycle simulation system according to claim 1, further comprising a display unit, wherein said controller relays a signal from a predetermined electric apparatus to said display unit, and wherein said display unit is a separate element from said dummy bicycle.

10. The bicycle simulation system according to claim 9, wherein the predetermined electronic apparatus is a crank angle rotation sensor, a speed sensor or a steering angle sensor.

11. A bicycle simulation system comprising:
a bicycle, said bicycle including:
a pair of pedals for being operated by a rider;
a frame that turnably supports said pedals;
a flywheel operating in conjunction with the pedals so as to exert an appropriate load on the pedals, the flywheel being rotatably drivable by a one-way clutch;
a controller, said controller being provided on said frame; and
a speed sensor that detects rotation of said pedals; and
a mimic sound generation unit connected to the controller, wherein the mimic sound generation unit is configured to generate a mimic sound based on a first frequency, the first frequency being different from a second frequency of an actual sound generated by the one-way clutch, the first frequency being obtained based on the rotation of said pedals detected by the speed sensor,
wherein the first frequency is obtained based on a rotation speed of the flywheel and a rotation speed of a crankshaft on which the pedals rotate.

12. The bicycle simulation system according to claim 11, wherein said frame includes a stand as a support member, and said controller is provided at said stand.

13. The bicycle simulation system according to claim 11, further comprising a mat switch provided for detecting treading on a floor by a foot or feet of the rider, said mat switch being connected to said controller.

14. A bicycle simulation system comprising:
a bicycle, said bicycle including:
a pair of pedals for being operated by a rider;
a frame that turnably supports said pedals;
a controller, said controller being provided on said frame; and
a speed sensor that detects rotation of said pedals; and
a display unit,
wherein a signal from said speed sensor is relayed to said display unit by said controller, said display unit displaying a scene that corresponds to a velocity detected by said speed sensor, and
wherein said dummy bicycle further comprises:
a rotary body that is rotated in conjunction with the operation of said pedals;
said speed sensor is a first speed sensor that detects the rotation speed of a crankshaft on which said pedals rotate;
a second speed sensor that detects the rotation speed of said rotary body;
a simulated velocity setting unit for determining a simulated running velocity based on the rotation speed of said rotary body detected by said second speed sensor, said display unit displaying a scene based on the simulated running velocity;
a frequency setting unit that determines a frequency by multiplying a difference between a sprocket rotation speed that is obtained by multiplying the rotation speed of the crankshaft detected by the first speed sensor by a predetermined gear ratio and a virtual rear wheel rotation speed obtained from said simulated running velocity by a coefficient; and
a mimic sound generation unit for generating a mimic sound based on the frequency.

15. The bicycle simulation system according to claim 14, wherein the mimic sound is a sound obtained by recording a notch sound generated by a one-way clutch.

16. The bicycle simulation system according to claim 14, wherein said mimic sound generation unit stops generating the mimic sound when the sprocket rotation speed is not less than the virtual rear wheel rotation speed.

17. The bicycle simulation system according to claim 14, wherein said simulated velocity setting unit varies the simulated running velocity according to a slope inclination degree when the situation in a simulated riding assumed is a slope.

18. A bicycle simulation system comprising:
a bicycle, said bicycle including:
a pair of pedals for being operated by a rider;
a frame that turnably supports said pedals;
a controller, said controller being provided on said frame; and
a speed sensor that detects rotation of said pedals; and a display unit, wherein a signal from said speed sensor is relayed to said display unit by said controller, said display unit displaying a scene that corresponds to a velocity detected by said speed sensor, and wherein said dummy bicycle further comprises:

said speed sensor detects the rotation speed of a crankshaft on which said pedals rotate a simulated velocity setting unit that sets a simulated running velocity, said display unit displaying a scene varied in correspondence with the simulated running velocity;

a frequency setting unit that determines a frequency proportional to a positive value, when a value obtained by subtracting the rotation speed of said crankshaft multiplied by a coefficient from said simulated running velocity is a positive value; and a mimic sound generation unit for generating a mimic sound based on the frequency.

19. The bicycle simulation system according to claim 11, further comprising a display unit, wherein a signal from said speed sensor is relayed to said display unit by said controller, said display unit displaying a scene that corresponds to a velocity detected by said speed sensor, and wherein said display unit is a separate element from said dummy bicycle.

20. The bicycle simulation system according to claim 1, wherein the first frequency is obtained based on a difference between a virtual wheel rotation speed and a rear sprocket rotation speed of the dummy bicycle, and a number of times of notch sound generation per revolution of a one-way clutch of a rear wheel in a real bicycle.

21. The bicycle simulation system according to claim 11, wherein the first frequency is obtained based on a difference between a virtual wheel rotation speed and a rear sprocket rotation speed of the dummy bicycle, and a number of times of notchsound generation per revolution of a one-way clutch of a rear wheel in a real bicycle.

* * * * *